(12) United States Patent
Tachibana et al.

(10) Patent No.: US 12,197,009 B2
(45) Date of Patent: Jan. 14, 2025

(54) OPTICAL FIBER CUTTER AND METHOD OF CUTTING OPTICAL FIBER

(71) Applicant: Fujikura Ltd., Tokyo (JP)

(72) Inventors: Yuuko Tachibana, Sakura (JP); Ryo Hasegawa, Sakura (JP); Yoshiharu Kanda, Sakura (JP)

(73) Assignee: Fujikura Ltd., Tokyo (JP)

( * ) Notice: Subject to any disclaimer, the term of this patent is extended or adjusted under 35 U.S.C. 154(b) by 274 days.

(21) Appl. No.: 17/926,022

(22) PCT Filed: Feb. 15, 2021

(86) PCT No.: PCT/JP2021/005473
§ 371 (c)(1),
(2) Date: Nov. 17, 2022

(87) PCT Pub. No.: WO2021/235028
PCT Pub. Date: Nov. 25, 2021

(65) Prior Publication Data
US 2023/0176285 A1  Jun. 8, 2023

(30) Foreign Application Priority Data

May 20, 2020  (JP) ................................ 2020-088057
Feb. 5, 2021   (JP) ................................ 2021-017672

(51) Int. Cl.
  *G02B 6/25*   (2006.01)
  *C03B 37/16*  (2006.01)

(52) U.S. Cl.
  CPC ............... *G02B 6/25* (2013.01); *C03B 37/16* (2013.01)

(58) Field of Classification Search
  CPC .................................. G02B 6/25; C03B 37/16
  (Continued)

(56) References Cited

U.S. PATENT DOCUMENTS

2006/0201986 A1* 9/2006 Sasaki ............... B26D 3/08
                                                225/105
2018/0272552 A1* 9/2018 Sasaki ............... B26D 7/02
(Continued)

FOREIGN PATENT DOCUMENTS

CN  1251904 A    5/2000
CN  103149631 A  6/2013
(Continued)

OTHER PUBLICATIONS

International Search Report issued in corresponding International Application No. PCT/JP2021/005473; mailed Apr. 22, 2021 (2 pages).

*Primary Examiner* — Omar Flores Sanchez
(74) *Attorney, Agent, or Firm* — Osha Bergman Watanabe & Burton LLP

(57) ABSTRACT

An optical fiber cutter includes: a fiber holder that holds optical fibers disposed in a row in a first perpendicular direction perpendicular to a longitudinal direction of the optical fibers, wherein each of the optical fibers includes a glass portion and a coated portion that covers the glass portion; an alignment member having an insertion hole through which the glass portions extending from the fiber holder are inserted; a base including; a first placement portion on which the fiber holder is disposed; and a second placement portion positioned at a distance from the first placement portion, and on which the alignment member is disposed; and a blade member that scratches surfaces of the glass portions by moving in the first perpendicular direction between the first placement portion and the second placement portion with respect to the base.

13 Claims, 14 Drawing Sheets

(58) Field of Classification Search
USPC .......................................................... 83/375
See application file for complete search history.

(56) References Cited

U.S. PATENT DOCUMENTS

| | | | |
|---|---|---|---|
| 2019/0278025 A1* | 9/2019 | Murgatroyd | G02B 6/3826 |
| 2021/0373239 A1* | 12/2021 | Bickham | B23K 26/53 |
| 2023/0333336 A1* | 10/2023 | Huang | G02B 6/4277 |
| 2024/0085644 A1* | 3/2024 | Dinkel | G02B 6/3839 |

FOREIGN PATENT DOCUMENTS

| | | |
|---|---|---|
| CN | 110178063 A | 8/2019 |
| JP | H056403 U | 1/1993 |
| JP | 2000108083 A | 4/2000 |
| JP | 2011191356 A | 9/2011 |
| JP | 2019113730 A | 7/2019 |
| WO | 2019/130761 A1 | 7/2019 |

* cited by examiner

OPTICAL FIBER CUTTER AND METHOD OF CUTTING OPTICAL FIBER

CROSS-REFERENCE TO RELATED APPLICATIONS

The present application is a continuation application of International Application No. PCT/JP2021/005473, filed Feb. 15, 2021, which claims priority to Japanese Patent Application No. 2020-088057, filed May 20, 2020, and priority to Japanese Patent Application No. 2021-017672, filed Feb. 5, 2021. The contents of these applications are incorporated herein by reference in their entirety.

BACKGROUND

Technical Field

The present invention relates to an optical fiber cutter and a method of cutting an optical fiber.

Description of the Related Art

Patent Document 1 discloses an optical fiber cutter which collectively cuts a plurality of optical fibers aligned in a row. In the optical fiber cutter of Patent Document 1, in order to align end surfaces of a plurality of cut optical fibers, the plurality of optical fibers is respectively accommodated in a plurality of V-grooves of an optical fiber mounting V-groove portion to align the plurality of optical fibers in a row.

Patent Document

Patent Document 1: Japanese Patent Application Publication No. 2000-108083

Incidentally, when a plurality of optical fibers is collectively cut in practice, the coating is removed from the plurality of optical fibers to expose a plurality of glass portions, and then the plurality of glass portions is cut. The exposed plurality of glass portions is likely to intersect each other or overlap in a direction perpendicular to a longitudinal direction of the optical fibers and an alignment direction of the plurality of optical fibers. Therefore, it is difficult to respectively accommodate the plurality of glass portions in the plurality of V-grooves as in Patent Document 1. Also, two adjacent glass portions may be attracted to each other and come out of the V-grooves by the surface tension of a liquid for removing the coating (for example, alcohol) or dielectric polarization due to static electricity. Therefore, it is not easy to align a plurality of glass portions in a row in the optical fiber cutter of Patent Document 1.

SUMMARY

One or more embodiments may provide an optical fiber cutter and a method of cutting an optical fiber which are capable of easily aligning a plurality of glass portions in a row.

An optical fiber cutter according to one or more embodiments includes a fiber holder which holds a plurality of optical fibers each having a glass portion and a coated portion that covers the glass portion in a state in which the plurality of optical fibers are aligned in a row in a first perpendicular direction perpendicular to a longitudinal direction thereof, an alignment member which has an insertion hole through which glass portions of the plurality of optical fibers extending from the fiber holder are inserted, a base having a first placement portion on which the fiber holder is placed, and a second placement portion which is positioned at a distance from the first placement portion and on which the alignment member is placed, and a blade member which scratches surfaces of the plurality of glass portions by moving in the first perpendicular direction between the first placement portion and the second placement portion with respect to the base. An inner surface of the insertion hole is formed such that the glass portions positioned in the insertion hole are aligned in a row in the first perpendicular direction and the glass portions positioned in the insertion hole are not pressed. The alignment member is undetachably attached to the base. The alignment member is attached to the base to be movable in a second perpendicular direction perpendicular to the longitudinal direction and the first perpendicular direction.

An optical fiber cutter according to one or more embodiments includes a fiber holder which holds a plurality of optical fibers each having a glass portion and a coated portion that covers the glass portion in a state in which the plurality of optical fibers are aligned in a row in a first perpendicular direction perpendicular to a longitudinal direction thereof, an alignment member which has an insertion hole through which glass portions of the plurality of optical fibers extending from the fiber holder are inserted, a base having a first placement portion on which the fiber holder is placed, and a second placement portion which is positioned at a distance from the first placement portion and on which the alignment member is placed, and a blade member which scratches surfaces of the plurality of glass portions by moving in the first perpendicular direction between the first placement portion and the second placement portion with respect to the base. An inner surface of the insertion hole is formed such that the glass portions positioned in the insertion hole are aligned in a row in the first perpendicular direction and the glass portions positioned in the insertion hole are not pressed. The alignment member has a locking recess. The second placement portion of the base has a locking protrusion which is to be inserted into the locking recess of the alignment member. The alignment member is detachably attachable to the base.

An optical fiber cutter according to one or more embodiments includes a fiber holder which holds a plurality of optical fibers each having a glass portion and a coated portion that covers the glass portion in a state in which the plurality of optical fibers are aligned in a row in a first perpendicular direction perpendicular to a longitudinal direction thereof, an alignment member which has an insertion hole through which glass portions of the plurality of optical fibers extending from the fiber holder are inserted, a base having a first placement portion on which the fiber holder is placed, and a second placement portion which is positioned at a distance from the first placement portion and on which the alignment member is placed, and a blade member which scratches surfaces of the plurality of glass portions by moving in the first perpendicular direction between the first placement portion and the second placement portion with respect to the base. An inner surface of the insertion hole is formed such that the glass portions positioned in the insertion hole are aligned in a row in the first perpendicular direction and the glass portions positioned in the insertion hole are not pressed. The alignment member is undetachably attached to the base. The alignment member is attached to the base to be rotatable with a fulcrum shaft parallel to the first perpendicular direction as a center.

In the optical fiber cutter described above, in a state in which the plurality of optical fibers are held by the fiber holder and the plurality of glass portions extending from the fiber holder are inserted into the insertion hole of the alignment member, the parts of the plurality of glass portions positioned between the fiber holder and the alignment member can be easily aligned in a row in the first perpendicular direction by simply moving the fiber holder and the alignment member in directions away from each other.

In the optical fiber cutter according to one or more embodiments, the alignment member may include a placement table having a placement surface on which the plurality of glass portions are placed, and a lid member which is movable between a first position at which the insertion hole is formed between itself and the placement surface by being disposed spaced apart from the placement surface in the second perpendicular direction perpendicular to the longitudinal direction and the first perpendicular direction, and a second position at which the placement surface is open.

In the optical fiber cutter according to one or more embodiments, the lid member may be connected to the placement table to be rotationally movable between the first position and the second position.

In the optical fiber cutter according to one or more embodiments, a height dimension of the insertion hole in the second perpendicular direction perpendicular to the longitudinal direction and the first perpendicular direction may be larger than a diameter dimension of each of the glass portions and smaller than twice the diameter dimension.

A method of cutting an optical fiber according to one or more embodiments includes preparing an optical fiber cutter including a fiber holder, an alignment member having an insertion hole, and a blade member, using the fiber holder, holding a plurality of optical fibers each including a glass portion and a coated portion that covers the glass portion in a state in which the plurality of optical fibers are aligned in a row in a first perpendicular direction perpendicular to a longitudinal direction thereof, inserting glass portions of the plurality of optical fibers extending from the fiber holder through the insertion hole, moving only the alignment member to be separated from the fiber holder in a state in which the fiber holder is fixed, or moving both the fiber holder and of the alignment member such that the fiber holder and the alignment member are separated from each other, aligning the plurality of glass portions such that parts of the plurality of glass portions which are positioned between the fiber holder and the alignment member are aligned in a row in the first perpendicular direction, and scratching surfaces of the glass portions by use of the blade member.

In the method of cutting an optical fiber described above, in a state in which the plurality of optical fibers are held by the fiber holder and the plurality of glass portions extending from the fiber holder are inserted into the insertion hole of the alignment member, the parts of the plurality of glass portions positioned between the fiber holder and the alignment member can be easily aligned in a row in the first perpendicular direction by simply moving the fiber holder and the alignment member in directions away from each other.

According to one or more embodiments, when glass portions of the plurality of optical fibers are collectively cut, the plurality of glass portions can be easily aligned in a row.

DETAILED DESCRIPTION

Hereinafter, an optical fiber cutter according to one or more embodiments will be described with reference to FIGS. 1 to 9.

Figure 1:
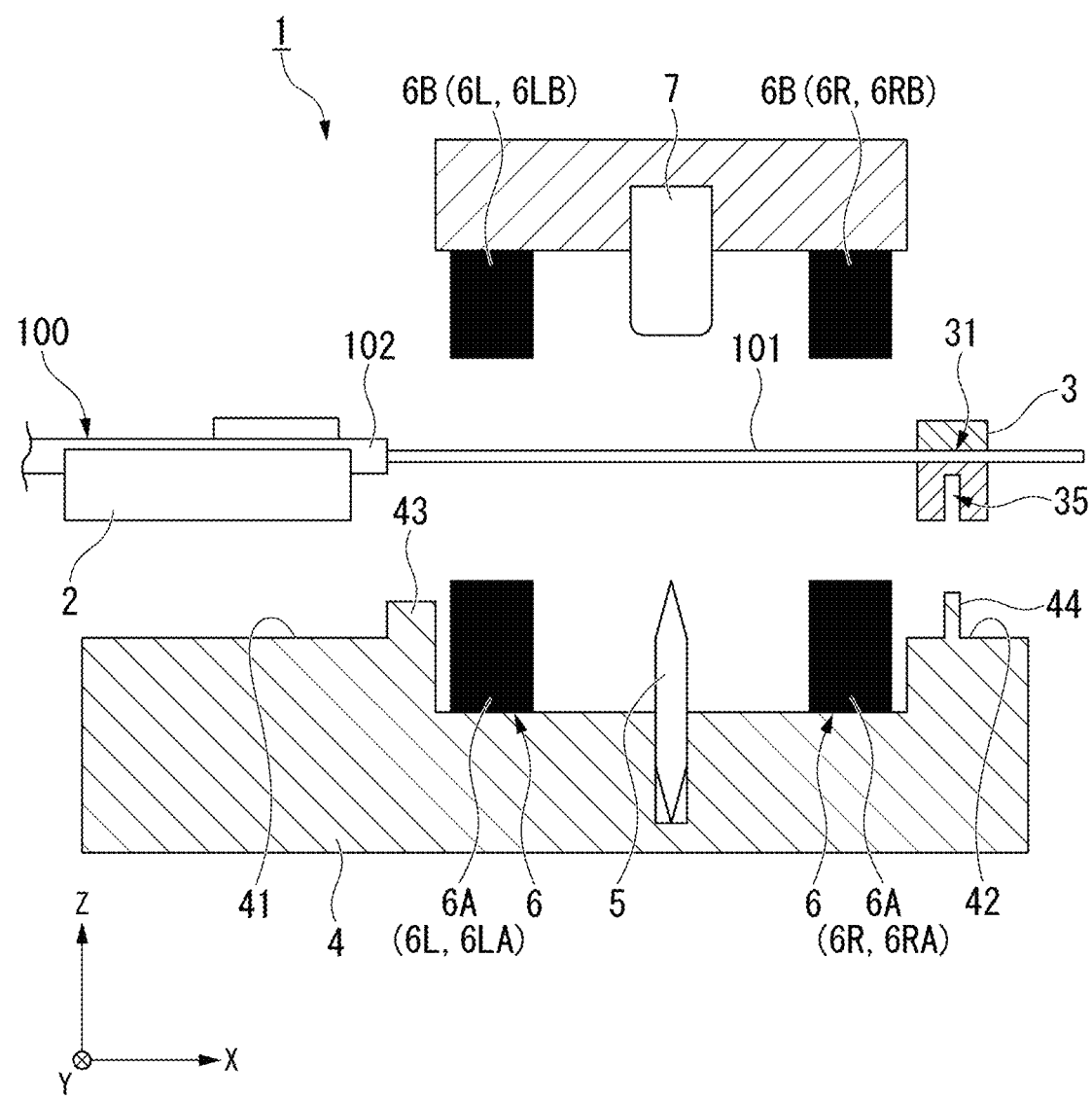
FIG. 1 is a cross-sectional view schematically showing an optical fiber cutter according to one or more embodiments.
Figure 2:
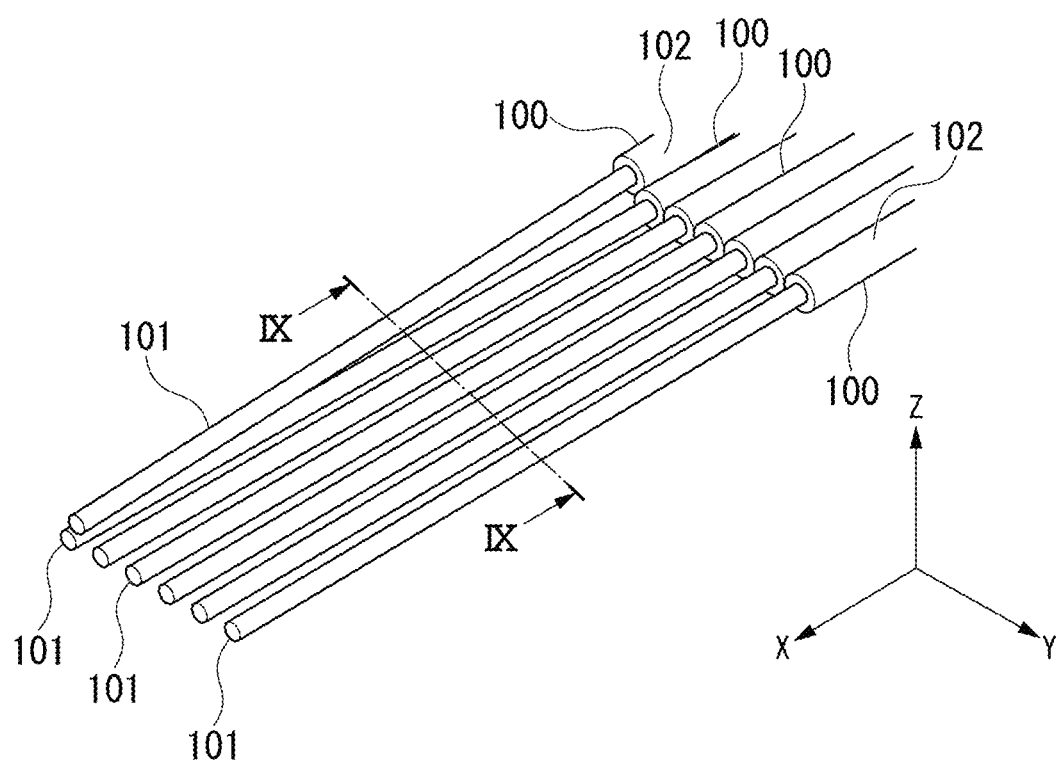
FIG. 2 is a perspective view showing an example of a plurality of optical fibers handled in the optical fiber cutter shown in FIG. 1.

An optical fiber cutter 1 of one or more embodiments shown in FIG. 1 is a device which collectively cuts a plurality of optical fibers 100 shown in FIG. 2. The plurality of optical fibers 100 each include a glass portion 101 and a coated portion 102 that covers the glass portion 101. The plurality of optical fibers 100 that are cut in the optical fiber cutter 1 may be, for example, multicore tape optical fibers that are connected in a state in which the plurality of optical fibers 100 are aligned in a row, or a plurality of optical fibers 100 that are not connected. Also, the plurality of optical fibers 100 that are cut in the optical fiber cutter 1 may have a configuration in which, for example, the plurality of optical fibers 100 are connected to be aligned in a row immediately before they are cut.

In one or more embodiments, a longitudinal direction of the optical fibers 100 is denoted by an X-axis direction. Also, a first perpendicular direction in which the plurality of optical fibers 100 are aligned perpendicular to the longitudinal direction of the optical fibers 100 is denoted by a Y-axis direction, and a second perpendicular direction perpendicular to the longitudinal direction and the first perpendicular direction of the optical fibers 100 is denoted by a Z-axis direction. Also, in the following description, the first perpendicular direction (Y-axis direction) will be referred to as a width direction, and the second perpendicular direction (Z-axis direction) will be referred to as a vertical direction in some cases.

As shown in FIG. 1, the optical fiber cutter 1 includes a fiber holder 2, an alignment member 3, a base 4, and a blade member 5. Also, the optical fiber cutter 1 includes a pair of clamps 6 and a pressing member 7. The pair of the clamps 6 are constituted of first clamps 6L positioned at the left side and second clamps 6R positioned at the right side.

The fiber holder 2 holds the plurality of optical fibers 100 shown in FIG. 2 with the plurality of optical fibers 100 aligned in a row in the first perpendicular direction. The fiber holder 2 mainly holds a part of the plurality of optical fibers 100 including the coated portion 102 to sandwich the part in the second perpendicular direction. The fiber holder 2 holds a part of the plurality of optical fibers 100 in the longitudinal direction. The plurality of optical fibers 100 are immovably fixed in the longitudinal direction and the first perpendicular direction in a state of being held by the fiber holder 2.

Figure 3:
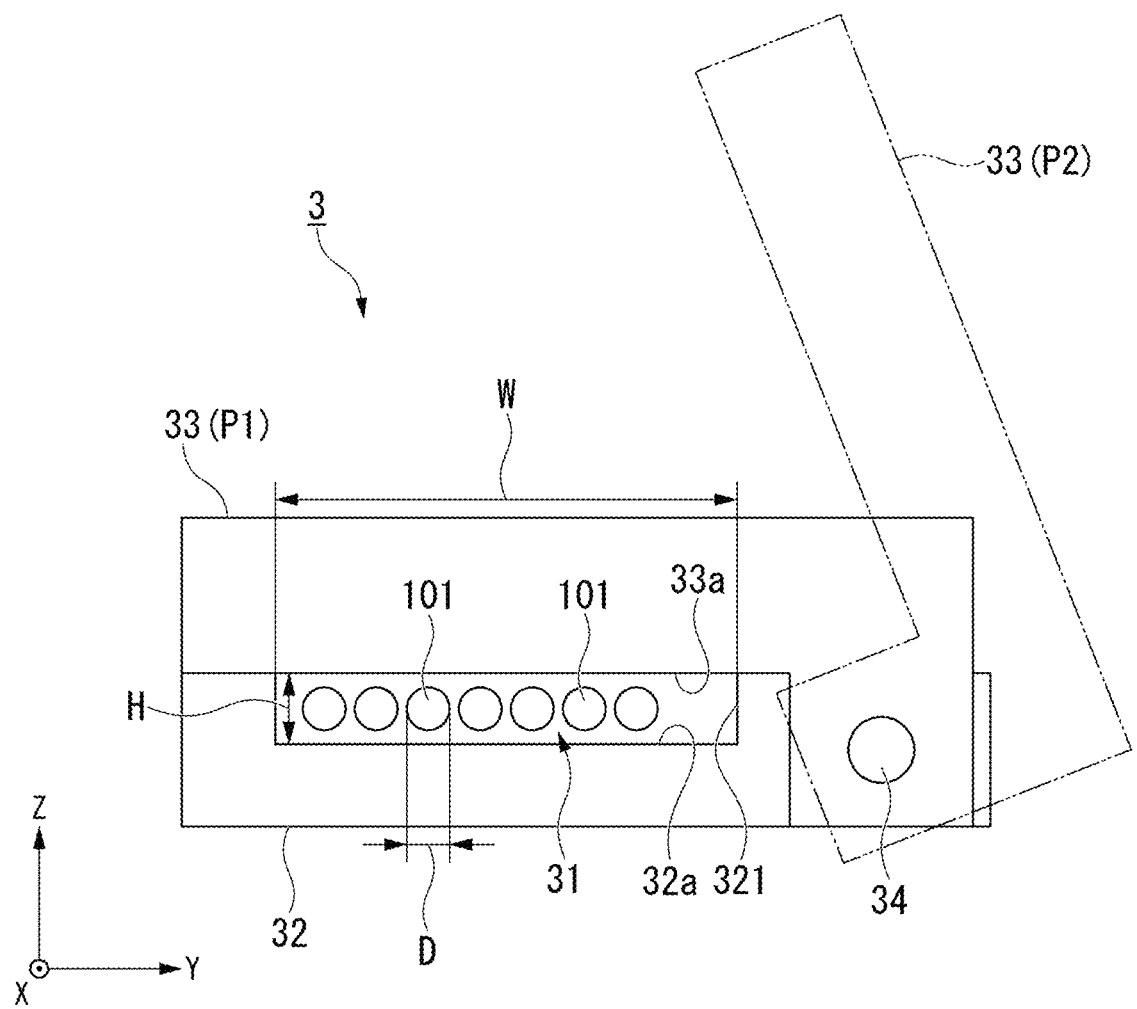
FIG. 3 is a side view showing an alignment member of the optical fiber cutter shown in FIG. 1.

As shown in FIGS. 1 and 3, the alignment member 3 has an insertion hole 31. The insertion hole 31 allows a plurality of glass portions 101 exposed from the coated portions 102 of the plurality of optical fibers 100 extending from the fiber holder 2 to be inserted. An inner surface of the insertion hole 31 is formed such that the glass portions 101 positioned in the insertion hole 31 do not overlap in the second perpendicular direction and are aligned in a row in the first perpendicular direction. Also, the inner surface of the insertion hole 31 is formed not to press the plurality of glass portions 101 positioned in the insertion hole 31.

Specifically, the insertion hole 31 is formed in an elongated shape extending in the first perpendicular direction when viewed from a penetration direction (X-axis direction) of the insertion hole 31. A width dimension W of the insertion hole 31 in the first perpendicular direction is equal to or larger than a sum of diameter dimensions D of the plurality of glass portions 101 passing through the insertion hole 31. Also, a height dimension H of the insertion hole 31 in the second perpendicular direction is larger than the diameter dimension D of each the glass portions 101 and smaller than twice the diameter dimension D.

Figure 5:
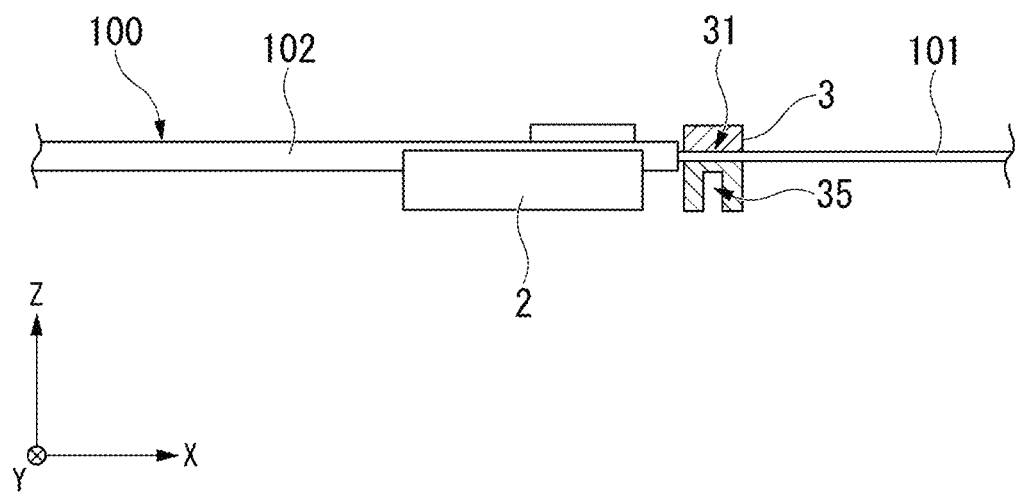
FIG. 5 is a cross-sectional explanatory view showing the method of cutting the plurality of optical fibers using the optical fiber cutter shown in FIG. 1.

Therefore, the plurality of glass portions 101 passing through the insertion hole 31 are aligned in a row in the first perpendicular direction without overlapping in the second perpendicular direction and are not pressed by the inner surface of the insertion hole 31. Then, as shown in FIGS. 5 and 6, the alignment member 3 can be moved relative to the fiber holder 2 in the longitudinal direction of the optical fibers 100 in a state in which the plurality of optical fibers 100 are held by the fiber holder 2 and the plurality of glass portions 101 extending from the fiber holder 2 are inserted into the insertion hole 31. Then, when either or both of the alignment member 3 and the fiber holder 2 are moved in directions away from each other, parts of the plurality of glass portions 101 positioned between the fiber holder 2 and the alignment member 3 are aligned in a row in the first perpendicular direction.

Figure 6A:
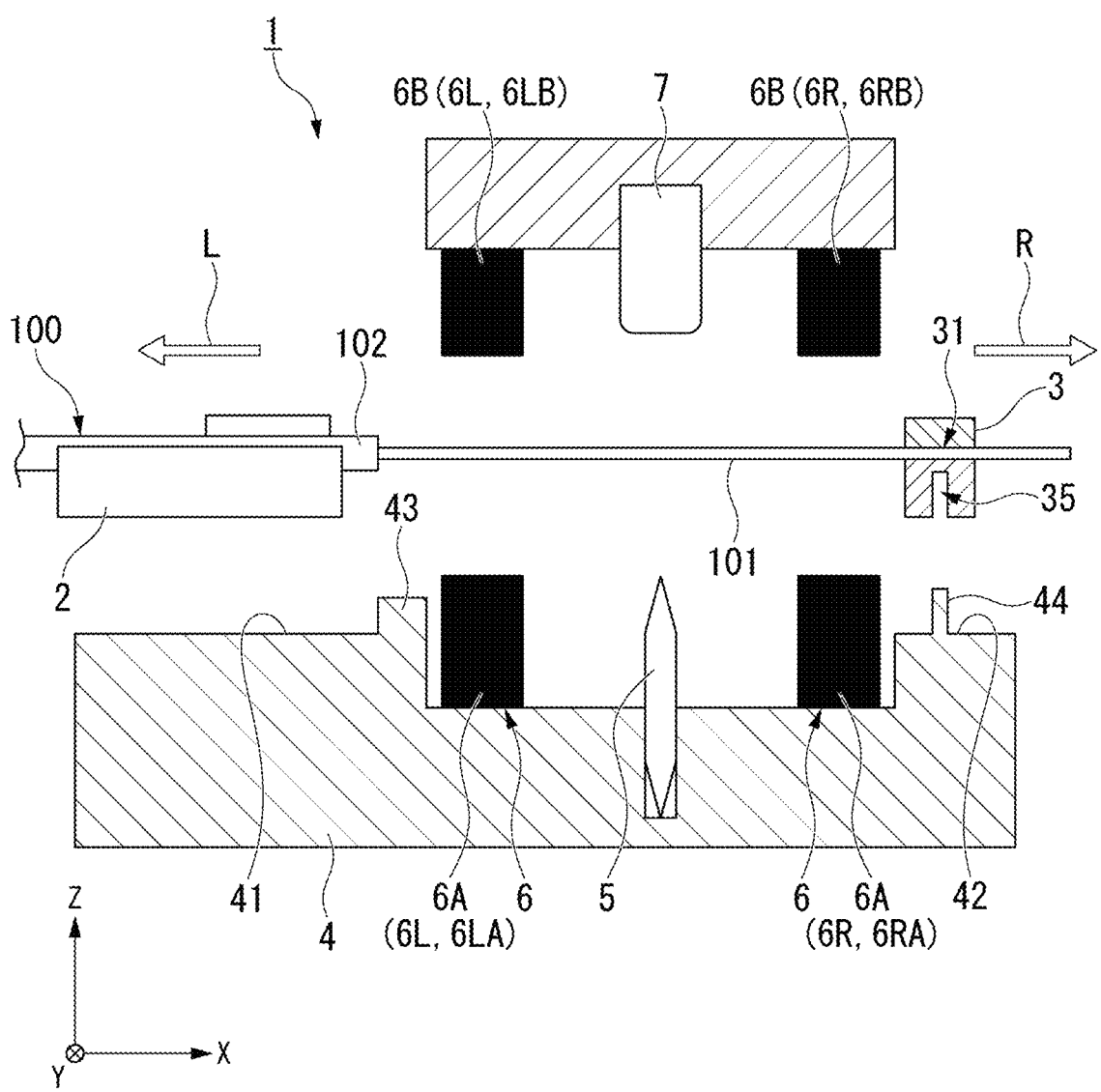
FIG. 6A is a cross-sectional explanatory view showing the method of cutting the plurality of optical fibers using the optical fiber cutter shown in FIG. 1.
Figure 7:
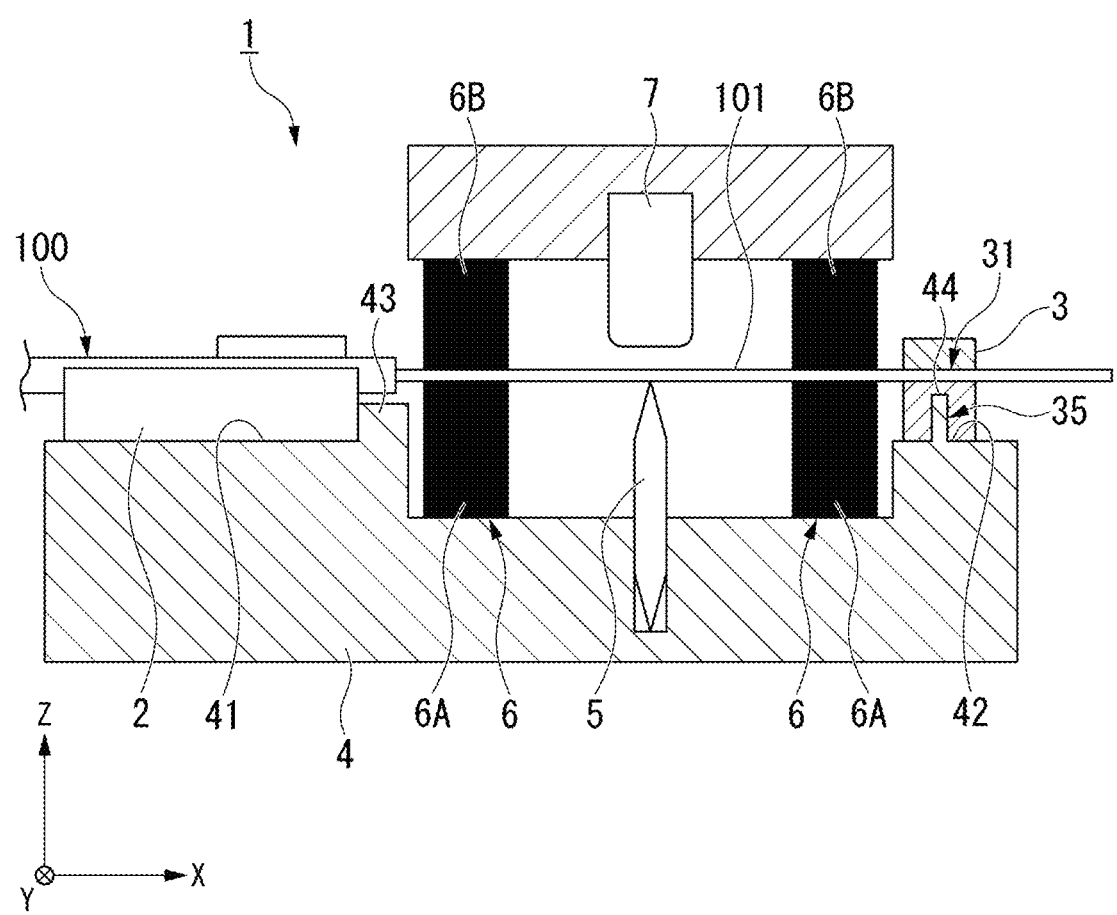
FIG. 7 is a cross-sectional explanatory view showing the method of cutting the plurality of optical fibers using the optical fiber cutter shown in FIG. 1.

As shown in FIG. 3, the alignment member 3 of one or more embodiments includes a placement table 32 and a lid member 33. Furthermore, as shown in FIGS. 1, 6A, and 7, the alignment member 3 has a locking recess 35. As described below, a locking protrusion 44 of a second placement portion 42 is inserted into the locking recess 35. The alignment member 3 is detachably attachable to the base 4 by insertion or removal of the locking protrusion 44 with respect to the locking recess 35.

The placement table 32 has a placement surface 32a on which the plurality of glass portions 101 are placed. The placement surface 32a is a flat surface extending in the first perpendicular direction and constitutes a part of the inner surface of the insertion hole 31. Specifically, a recess 321 that is recessed in the second perpendicular direction is formed in the placement table 32. The placement surface 32a described above consists of a bottom surface of the recess 321. In one or more embodiments, a width dimension of the recess 321 in the first perpendicular direction corresponds to the width dimension W of the insertion hole 31 described above, and a depth dimension of the recess 321 in the second perpendicular direction corresponds to the height dimension H of the insertion hole 31 described above.

The lid member 33 is movable with respect to the placement table 32 between a first position P1 and a second position P2. The first position P1 is a position of the lid member 33 that forms the insertion hole 31 between itself and the placement surface 32a when the lid member 33 is disposed spaced apart from the placement surface 32a of the placement table 32 in the second perpendicular direction (upward). The second position P2 is a position of the lid member 33 at which the placement surface 32a is open when the lid member 33 is disposed at a position that does not face the placement surface 32a. A facing surface 33a of the lid member 33, which faces the placement surface 32a of the placement table 32 in a state in which the lid member 33 is disposed at the first position P1, forms the inner surface of the insertion hole 31 of the alignment member 3 together with the placement surface 32a of the placement table 32. The facing surface 33a of the lid member 33 is formed to be flat. That is, a recess as in the placement table 32 is not formed in the lid member 33.

In one or more embodiments, the lid member 33 is connected to the placement table 32 to be rotationally movable between the first position P1 and the second position P2. A rotating shaft 34 that connects the placement table 32 and the lid member 33 to be rotationally movable relative to each other is attached to one end portion of the placement table 32 and the lid member 33 in the first perpendicular direction (Y-axis direction) so that an axis thereof is parallel to the longitudinal direction (X-axis direction) of the optical fibers 100.

As shown in FIG. 1, the base 4 includes a first placement portion 41 on which the fiber holder 2 is placed and a second placement portion 42 on which the alignment member 3 is placed. The second placement portion 42 has a locking protrusion 44 which is to be inserted into the locking recess 35 of the alignment member 3. The first placement portion 41 and the second placement portion 42 are disposed at a distance from each other in the longitudinal direction of the optical fibers 100. The first placement portion 41 and the second placement portion 42 maintain the distance between the fiber holder 2 and the alignment member 3 in a state in which the fiber holder 2 and the alignment member 3 are placed on the first placement portion 41 and the second placement portion 42, and particularly prevent the distance between the fiber holder 2 and the alignment member 3 from becoming smaller than a predetermined value. Specifically, when the alignment member 3 is placed on the second placement portion 42, the locking protrusion 44 formed on the second placement portion 42 is inserted into the locking recess 35 formed in the alignment member 3, and therefore a position of the alignment member 3 placed on the second placement portion 42 is held. Also, a locking wall portion 43 is formed on the second placement portion 42 side (on an X-axis positive direction side) of the first placement portion 41, and the fiber holder 2 placed on the first placement portion 41 comes into contact with the locking wall portion 43, and therefore a position of the fiber holder 2 with respect to the alignment member 3 can be held.

In one or more embodiments, the fiber holder 2 and the alignment member 3 are detachably attached to the base 4.

The pair of clamps 6 are provided on the base 4 and are disposed spaced apart in the longitudinal direction of the optical fiber 100 between the first placement portion 41 and the second placement portion 42 described above. The pair of clamps 6 hold the plurality of glass portions 101 positioned between the fiber holder 2 and the alignment member 3 in a state in which the fiber holder 2 and the alignment member 3 are placed on the first placement portion 41 and the second placement portion 42. Each of the clamps 6 (each of the first clamps 6L and the second clamps 6R) includes a lower clamp 6A and an upper clamp 6B that sandwich the plurality of glass portions 101 in the second perpendicular direction (Z-axis direction). In other words, the first clamps 6L include a first lower clamp 6LA corresponding to the lower clamp 6A and a first upper clamp 6LB corresponding to the upper clamp 6B. The second clamps 6R include a second lower clamp 6RA corresponding to the lower clamp 6A and a second upper clamp 6RB corresponding to the upper clamp 6B. Elastic pads such as rubber may be provided at portions of the lower clamp 6A and the upper clamp 6B that come into contact with the glass portions 101.

The blade member 5 is moved relative to the base 4 in the first perpendicular direction (Y-axis direction) between the pair of clamps 6 (between the first placement portion 41 and the second placement portion 42) described above to scratch surfaces of the plurality of glass portions 101 positioned between the pair of clamps 6. The blade member 5 scratches surfaces of the plurality of glass portions 101 by passing across a lower side (on a Z-axis negative direction side) of the plurality of glass portions 101 positioned between the pair of clamps 6.

The pressing member 7 press-bends scratched parts of the plurality of glass portions 101 that have been scratched by the blade member 5 to cut the plurality of glass portions 101. The pressing member 7 presses the plurality of glass portions 101 disposed between the pair of clamps 6 from above (from a Z-axis positive direction side) to cleave the plurality of glass portions 101 with the scratched parts of the plurality of glass portions 101 as a starting point.

Next, an example of a cutting method of cutting the plurality of optical fibers 100 using the optical fiber cutter 1 (a method of cutting an optical fiber) of one or more embodiments will be described.

Figure 4:
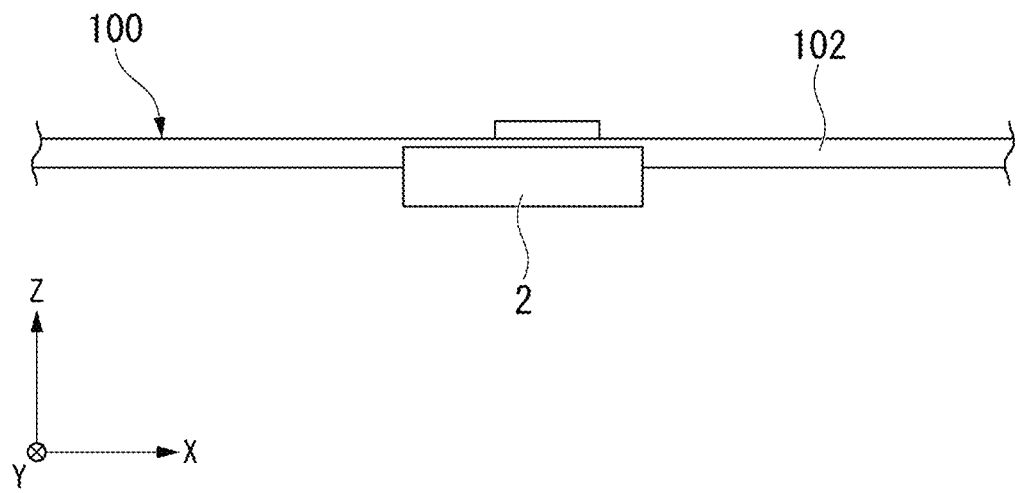
FIG. 4 is a cross-sectional explanatory view showing a method of cutting the plurality of optical fibers using the optical fiber cutter shown in FIG. 1.

When the plurality of optical fibers 100 are cut, first, as shown in FIG. 4, the plurality of optical fibers 100 are held by the fiber holder 2 in a state of being aligned in a row in the first perpendicular direction. Next, as shown in FIG. 5, the coated portions 102 are removed from parts of the plurality of optical fibers 100 extending from the fiber holder 2 (parts of the optical fibers 100 positioned on the rights side of the fiber holder 2 in FIG. 5) to expose the plurality of glass portions 101.

Thereafter, parts of the plurality of glass portions 101 extending from the fiber holder 2 that are positioned near the fiber holder 2 are inserted into the insertion hole 31 of the alignment member 3. Here, in the alignment member 3 of one or more embodiments, as shown in FIG. 3, the placement table 32 and the lid member 33 are connected to be rotationally movable. Therefore, when the plurality of glass portions 101 are inserted into the insertion hole 31 of the alignment member 3, first, the plurality of glass portions 101 are put into the recess 321 of the placement table 32 and placed on the placement surface 32a in a state in which the lid member 33 is disposed at the second position P2. When the plurality of glass portions 101 are put into the recess 321, the plurality of glass portions 101 can be stably placed on the placement surface 32a. Thereafter, the lid member 33 is moved from the second position P2 to the first position P1, and therefore a state in which the plurality of glass portions 101 are inserted into the insertion hole 31 of the alignment member 3 can be obtained.

After the plurality of glass portions 101 are inserted into the insertion hole 31 of the alignment member 3, the fiber holder 2 and the alignment member 3 are moved in directions away from each other in the longitudinal direction (X-axis direction) of the optical fibers 100 as shown in FIG. 6A. Particularly, the fiber holder 2 moves in the direction indicated by the arrow L, and the alignment member 3 moves in the direction indicated by the arrow R. Here, the height dimension H of the insertion hole 31 in the second perpendicular direction (Z-axis direction) is larger than the diameter dimension D of each of the glass portions 101 and smaller than twice the diameter dimension D. Therefore, when the fiber holder 2 and the alignment member 3 are moved in directions away from each other, the parts of the plurality of glass portions 101 positioned between the fiber holder 2 and the alignment member 3 are aligned in a row in the first perpendicular direction without overlapping in the second perpendicular direction (see FIGS. 3 and 8). Also, since the alignment member 3 does not grip the plurality of glass portions 101, stress (for example, bending stress, torsional stress, or tensile stress) caused by the fiber holder 2 and the alignment member 3 does not act on the parts of the plurality of glass portions 101 positioned between the fiber holder 2 and the alignment member 3.

In particular, in one or more embodiments, both the fiber holder 2 and the alignment member 3 move in the direction indicated by the arrows R and L shown in FIG. 6A such that the fiber holder 2 and the alignment member 3 are separated from each other. The invention is not limited to the above-described moving method. Only the alignment member 3 may move in the direction indicated by the arrow R so as to be separated from the fiber holder 2 in a state in which the fiber holder 2 is fixed. Only the fiber holder 2 may move in the direction indicated by the arrow L so as to be separated from the alignment member 3 in a state in which the alignment member 3 is fixed.

Figure 6B:
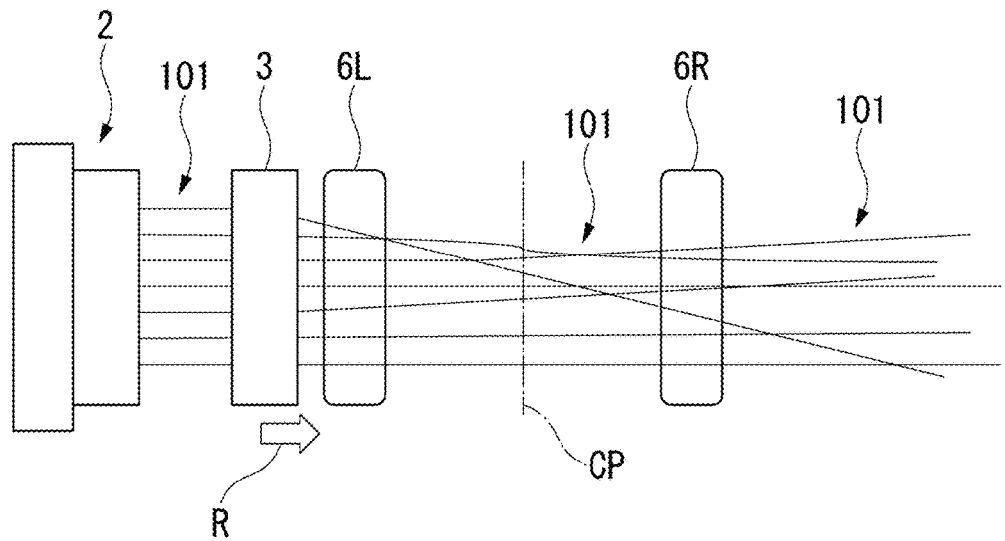
FIG. 6B is a plan explanatory view specifically showing relative movement between the fiber holder and the alignment member shown in FIG. 6A.
Figure 6C:
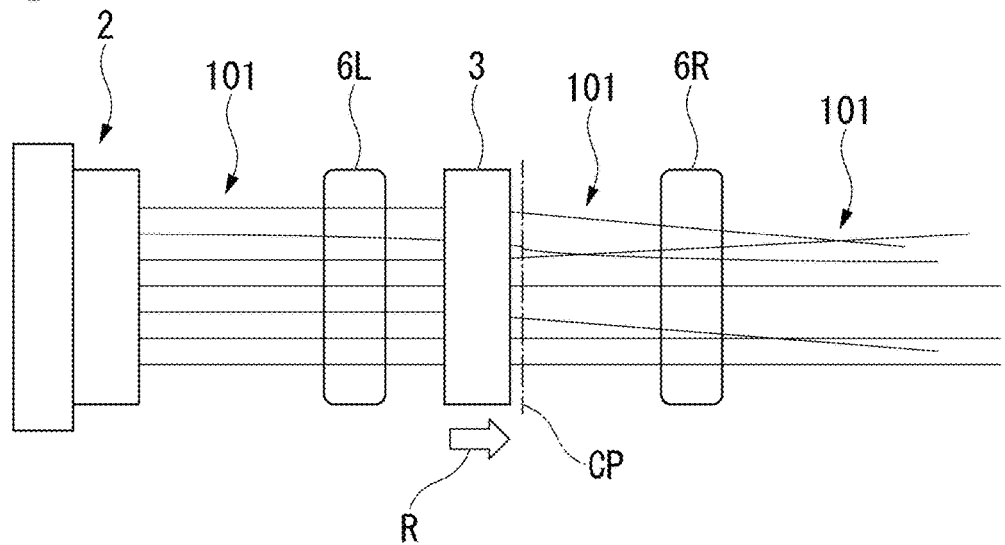
FIG. 6C is a plan explanatory view specifically showing relative movement between the fiber holder and the alignment member shown in FIG. 6A.
Figure 6D:
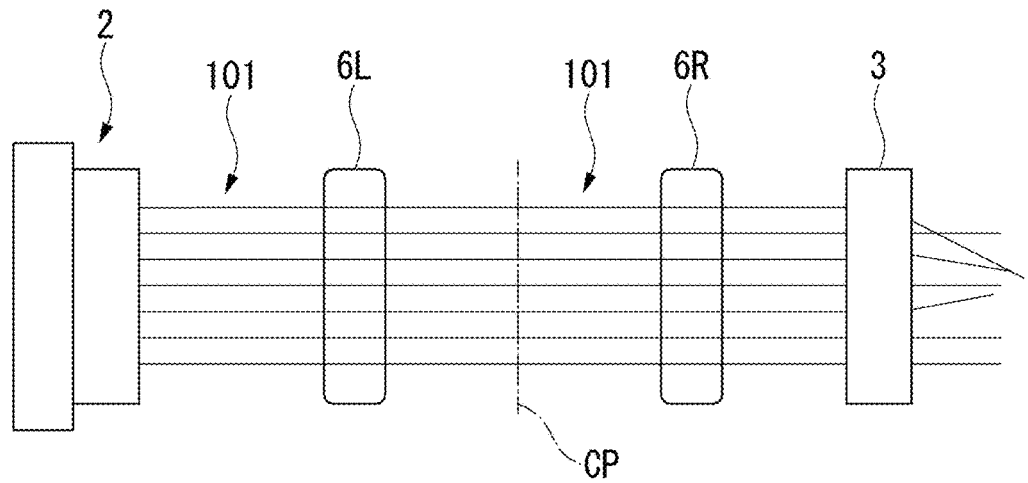
FIG. 6D is a plan explanatory view specifically showing relative movement between the fiber holder and the alignment member shown in FIG. 6A.

Next, a method of aligning the plurality of the glass portions 101 due to the above-mentioned relative movement between the fiber holder 2 and the alignment member 3 shown in FIG. 6A will be more specifically described with reference to FIGS. 6B to 6D. In FIGS. 6B to 6D, the plurality of the glass portions 101, the fiber holder 2, the alignment member 3, the first clamp 6L, the second clamp 6R, and a scratch position CP are only shown, and the other members constituting the optical fiber cutter are omitted. The scratch position CP is the position at which the blade member 5 scratches the plurality of the glass portions 101.

Firstly, as shown in FIG. 6B, in a state in which the plurality of the glass portions 101 are inserted into the insertion hole 31 of the alignment member 3, the alignment member 3 is disposed between the fiber holder 2 and the first clamp 6L. In this case, the plurality of the glass portions 101 are aligned between the alignment member 3 and the fiber holder 2 (that is, at the left side of the alignment member 3). In contrast, the plurality of the glass portions 101 are in a state of overlapping with each other at the region located at the right side of the alignment member 3 and are not aligned. Particularly, the plurality of the glass portions 101 multiply overlap at the scratch position CP positioned between the first clamp 6L and the second clamp 6R. In this state shown in FIG. 6B, since the plurality of the glass portions 101 are not aligned between the first clamp 6L and the second clamp 6R, in the case of scratching the plurality of the glass portions 101 at the scratch position CP, it is not possible to cut the glass portions 101 such that end faces the plurality of the glass portions 101 are aligned.

Next, as shown in FIG. 6C, in a state in which the plurality of the glass portions 101 are inserted into the insertion hole 31 of the alignment member 3, the alignment member 3 is slid in the direction indicated by reference letter R so as to be separated from the fiber holder 2. That is, the alignment member 3 moves in the direction from the state shown in FIG. 6B to the right side. Because of this, the alignment member 3 passes through (across) the first clamp 6L and reaches the position between the first clamp 6L and the second clamp 6R. Due to such movement of the alignment member 3, the overlap of the plurality of the glass portions 101 is gradually released. After pass of the alignment member 3, the plurality of the glass portions 101 do not overlap from each other between the alignment member 3 and the fiber holder 2 (that is, the left side of the alignment member 3), and a state in which the overlap of the plurality of the glass portions 101 is released, that is, a state in which the plurality of the glass portions 101 are aligned is obtained. However, in the state shown in FIG. 6C, the plurality of the glass portions 101 are not aligned at the scratch position CP.

Next, as shown in FIG. 6D, in a state in which the plurality of the glass portions 101 are inserted into the insertion hole 31 of the alignment member 3, the alignment member 3 is slid in the direction indicated by reference letter R so as to be further separated from the fiber holder 2. Particularly, the alignment member 3 further moves in the direction from the state shown in FIG. 6C to the right side. Because of this, the alignment member 3 passes through (across) the second clamp 6R and reaches the right position of FIG. 6D. Due to such movement of the alignment member 3, the overlap of the plurality of the glass portions 101 is further released. Particularly, a state in which the plurality of the glass portions 101 are aligned is obtained at the scratch position CP positioned between the first clamp 6L and the second clamp 6R. In the state shown in FIG. 6D, by scratching the plurality of the glass portions 101 at the scratch position CP (described hereinbelow, refer to FIG. 7), the plurality of the glass portions 101 can be finely aligned and cut.

Note that, in FIGS. 6B to 6D, the case was described in which the alignment member 3 only moves in the direction indicated by the arrow R in a state in which the fiber holder 2 is fixed. It is not limited to the above-described moving method, and as long as a method of separating the fiber holder 2 and the alignment member 3 from each other is used, the same action and the effect as those of FIGS. 6B to 6D are obtained.

Thereafter, as shown in FIG. 7, the fiber holder 2 is placed on the first placement portion 41 of the base 4, and the alignment member 3 is placed on the second placement portion 42 of the base 4. In this state, the plurality of glass portions 101 extend from the first placement portion 41 to the second placement portion 42 in a state in which the plurality of glass portions 101 are aligned in a row in the first perpendicular direction. Also in this state, stress caused by the fiber holder 2 and the alignment member 3 does not act on the parts of the plurality of glass portions 101 positioned between the fiber holder 2 and the alignment member 3.

Figure 8:
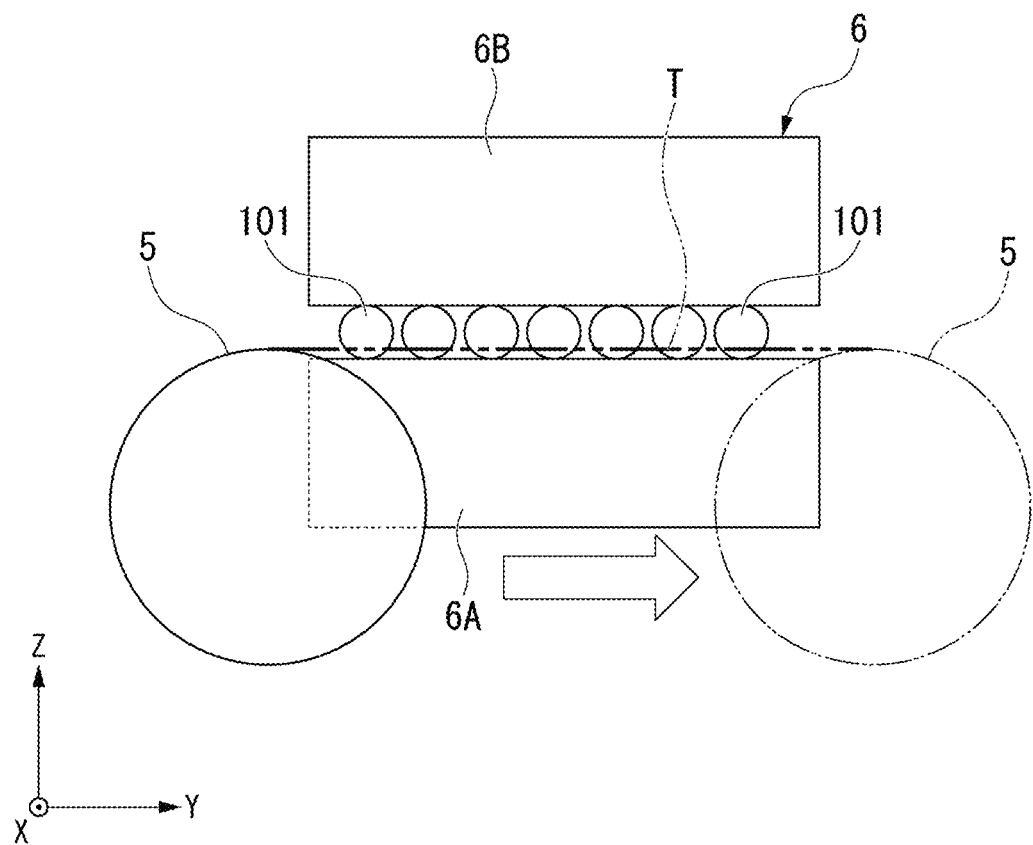
FIG. 8 is an explanatory view showing the method of cutting the plurality of optical fibers using the optical fiber cutter shown in FIG. 1.

Thereafter, the plurality of glass portions 101 aligned in a row between the fiber holder 2 and the alignment member 3 are held by the pair of clamps 6. Therefore, the plurality of glass portions 101 positioned between the alignment member 3 and the fiber holder 2 are positioned such that there is no deviation from each other in the second perpendicular direction as shown in FIG. 8.

Then, the blade member 5 is moved in the first perpendicular direction (in a direction in which the plurality of glass portions 101 are aligned) between the pair of clamps 6 to scratch surfaces of the plurality of glass portions 101. A two-dot dashed line in FIG. 8 indicates a trajectory T of an upper end of the blade member 5 that scratches the plurality of glass portions 101. As shown in FIG. 8, the plurality of glass portions 101 are positioned without being deviated from each other in the second perpendicular direction, and therefore the occurrence of a variation in the scratches of the plurality of glass portions 101 due to the blade member 5 can be minimized or prevented.

Figure 9:
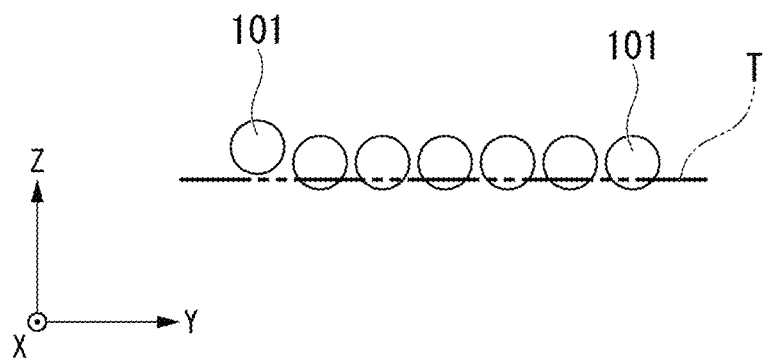
FIG. 9 is a cross-sectional view along the arrow IX-IX in FIG. 2.

Further, as shown in FIG. 2, a part of the plurality of glass portions 101 may not be aligned in a row and may overlap or intersect each other in the second perpendicular direction. In this case, even when the plurality of glass portions 101 are held by the pair of clamps 6, a part of the glass portions 101 (the glass portion 101 at a left end in FIG. 9) is positioned to be deviated from other glass portions 101 in the second perpendicular direction as shown in FIG. 9. Therefore, a variation occurs when the blade member 5 scratches the plurality of glass portions 101.

Finally, the pressing member 7 (see FIG. 8) press-bends the scratched parts of the plurality of glass portions 101 positioned between the pair of clamps 6 to cut the plurality of glass portions 101, and therefore the cutting method of the optical fiber is completed. When the pressing member 7 presses against the plurality of glass portions 101, the plurality of glass portions 101 are cleaved with the scratched parts of the plurality of glass portions 101 caused by the blade member 5 as a starting point, and therefore the plurality of glass portions 101 are cut.

As described above, according to the optical fiber cutter 1 of one or more embodiments, in a state in which the plurality of optical fibers 100 are held by the fiber holder 2 and the plurality of glass portions 101 extending from the fiber holder 2 are inserted into the insertion hole 31 of the alignment member 3, the parts of the plurality of glass portions 101 positioned between the fiber holder 2 and the alignment member 3 can be easily aligned in a row in the first perpendicular direction by simply moving the fiber holder 2 and the alignment member 3 in directions away from each other.

Then, when the parts of plurality of glass portions 101 positioned between the fiber holder 2 and the alignment member 3 can be aligned in a row in the first perpendicular direction, the occurrence of a variation in the scratches of the plurality of glass portions 101 can be minimized when the blade member 5 is moved in the first perpendicular direction to scratch the plurality of glass portions 101. Therefore, end surfaces of the plurality of cut glass portions 101 can be aligned.

Also, according to the optical fiber cutter 1 of one or more embodiments, the plurality of glass portions 101 are inserted into the insertion hole 31 of the alignment member 3 without being pressed by the alignment member 3, that is, the alignment member 3 does not grip the plurality of glass portions 101. Therefore, in a state in which the plurality of optical fibers 100 are held by the fiber holder 2 and the plurality of glass portions 101 extending from the fiber holder 2 are inserted into the insertion hole 31 of the alignment member 3, in a state after the fiber holder 2 and the alignment member 3 are moved in directions away from each other, stress caused by the fiber holder 2 and the alignment member 3 does not act on the plurality of glass portions 101 positioned between the fiber holder 2 and the alignment member 3. Therefore, even when the plurality of glass portions 101 positioned between the fiber holder 2 and the alignment member 3 are cut using the blade member 5, an angle formed by the end surfaces of the cut glass portions 101 with respect to the longitudinal direction of the optical fibers 100 is minimized or prevented from deviating from the vertical (90 degrees).

Also, according to the optical fiber cutter 1 of one or more embodiments, the alignment member 3 is detachably attached to the base 4. Therefore, when the plurality of glass portions 101 aligned in a row are cut, whether or not the alignment member 3 is used can be selected. For example, when the rigidity of the glass portion 101 is high due to a large diameter dimension D of the glass portion 101, the plurality of glass portions 101 can be aligned in a row by the rigidity of the glass portions 101 without using the alignment member 3. When the alignment member 3 is not used, the number of steps for cutting the optical fibers 100 can be reduced.

Also, according to the optical fiber cutter 1 of one or more embodiments, the alignment member 3 includes the placement table 32 having the placement surface 32a, and the lid member 33 that is movable between the first position P1 at which the lid member 33 covers the placement surface 32a with respect to the placement table 32 to form the insertion hole 31 between itself and the placement table 32 and the second position P2 at which the placement surface 32a is open. Therefore, after the plurality of glass portions 101 are placed on the placement surface 32a of the placement table 32 in a state in which the lid member 33 is disposed at the second position P2, the plurality of glass portions 101 can be easily brought into a state of being inserted in the insertion hole 31 of the alignment member 3 by simply moving the lid member 33 from the second position P2 to the first position P1. That is, the plurality of glass portions 101 can be caused to easily pass through the insertion hole 31 of the alignment member 3 compared to a simple alignment member 3 in which only the insertion hole 31 is formed.

Also, according to the optical fiber cutter 1 of one or more embodiments, the placement table 32 and the lid member 33 are connected to each other to be rotationally movable, and therefore the placement table 32 and the lid member 33 are undetachably attached to each other. Therefore, it is possible to prevent only one of the placement table 32 and the lid member 33 from being lost compared to a case in which the placement table 32 and the lid member 33 are detachably attached to each other.

Also, according to the optical fiber cutter 1 of one or more embodiments, the height dimension H of the insertion hole 31 of the alignment member 3 in the second perpendicular direction is larger than the diameter dimension D of the glass portion 101 and smaller than twice the diameter dimension D of the glass portion 101. Therefore, in a state in which the plurality of glass portions 101 are inserted into the insertion hole 31 of the alignment member 3, parts of two glass portions 101 positioned in the insertion hole 31 can be reliably prevented from overlapping in the second perpendicular direction. Therefore, when the fiber holder 2 and the alignment member 3 are moved in directions away from each other in a state in which the plurality of glass portions 101 are inserted into the insertion hole 31, the parts of the plurality of glass portions 101 positioned between the fiber holder 2 and the alignment member 3 can be easily and reliably aligned in a row in the first perpendicular direction.

Also, according to the optical fiber cutter 1 of one or more embodiments, the height dimension H of the insertion hole 31 of the alignment member 3 in the second perpendicular direction is larger than the diameter dimension D of the glass portion 101. Therefore, it is possible to prevent the alignment member 3 from pressing or gripping the plurality of glass portions 101 inserted into the insertion hole 31. Therefore, in a state after the plurality of glass portions 101 positioned between the fiber holder 2 and the alignment member 3 are aligned in a row by moving the fiber holder 2 and the alignment member 3 in directions away from each other, stress caused by the fiber holder 2 and the alignment member 3 can be prevented from acting on the parts of the plurality of glass portions 101 positioned between the fiber holder 2 and the alignment member 3.

While details of the invention have been described above, the invention is not limited to the above-described embodiments, and various modifications can be made without departing from the spirit of the invention.

Figure 10:
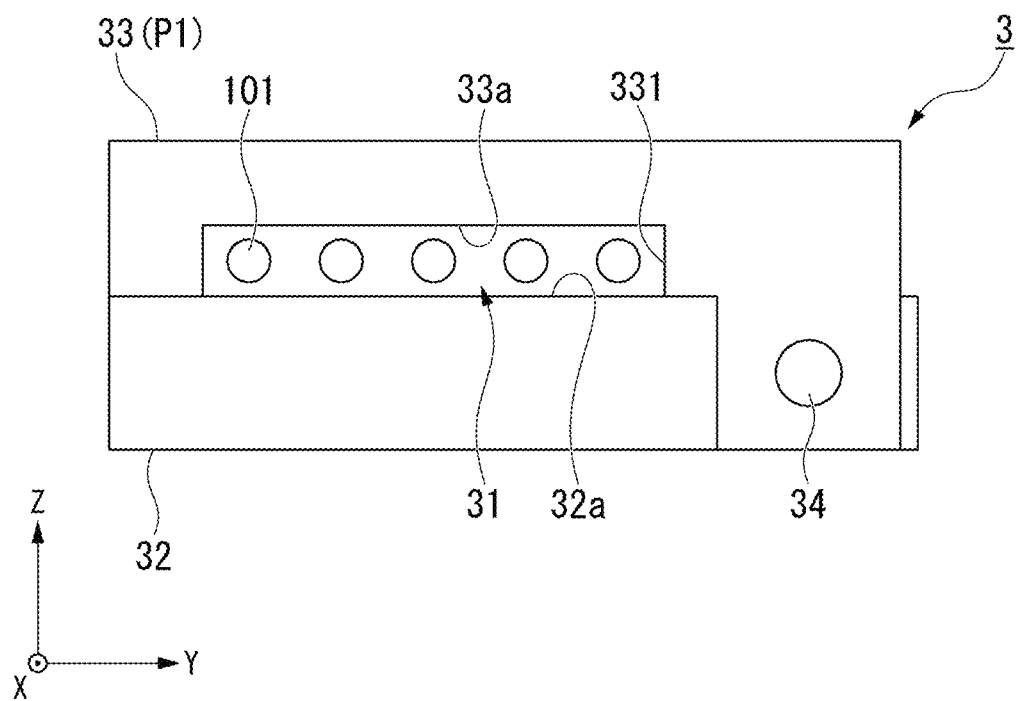
FIG. 10 is a side view showing a first modified example of the alignment member.

In the alignment member 3 of the optical fiber cutter according to one or more embodiments, for example, a recess 331 that constitutes the insertion hole 31 of the alignment member 3 may be formed only in the lid member 33 as shown in FIG. 10. In this case, a width dimension of the recess 331 of the lid member 33 in the first perpendicular direction (Y-axis direction) corresponds to the width dimension W (see FIG. 3) of the insertion hole 31, and a depth dimension of the recess 331 of the lid member 33 in the second perpendicular direction (Z-axis direction) corresponds to the height dimension H of the insertion hole 31 (see FIG. 3).

Figure 11:
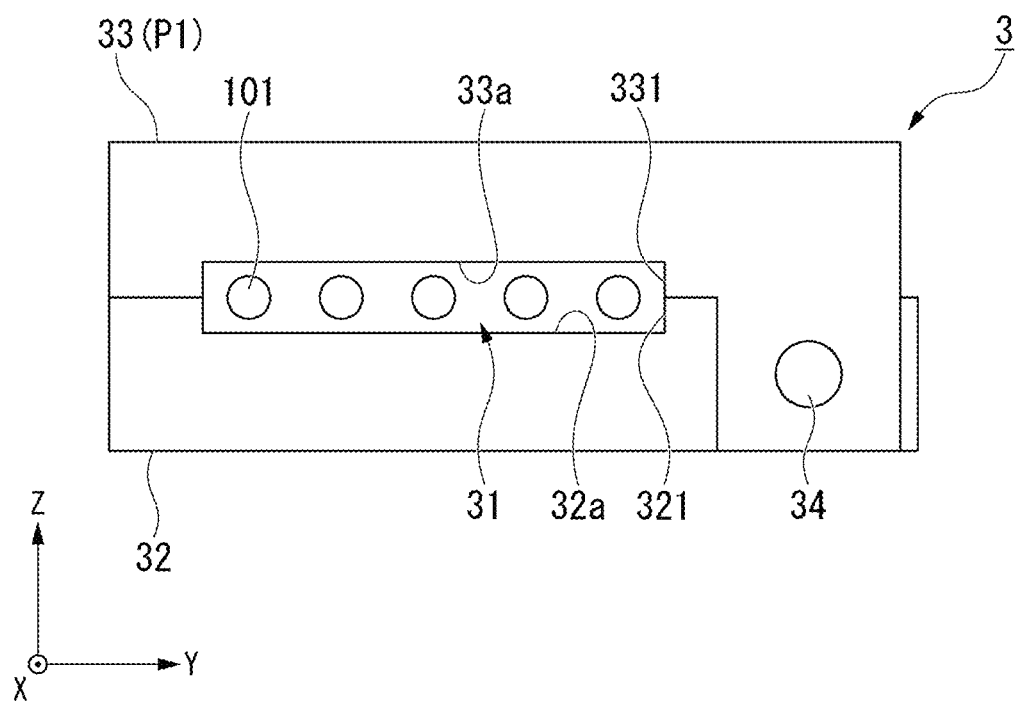
FIG. 11 is a side view showing a second modified example of the alignment member.

In the alignment member 3 of the optical fiber cutter according to one or more embodiments, for example, the recesses 321 and 331 constituting the insertion hole 31 of the alignment member 3 may be formed in both the placement table 32 and the lid member 33 as shown in FIG. 11. In this case, a width dimension of the recesses 321 and 331 of the placement table 32 and the lid member 33 in the first perpendicular direction (Y-axis direction) corresponds to the width dimension W (see FIG. 3) of the insertion hole 31, and a sum of depth dimensions of the recesses 321 and 331 of the placement table 32 and the lid member 33 in the second perpendicular direction (Z-axis direction) corresponds to the height dimension H (see FIG. 3) of the insertion hole 31.

Figure 12:
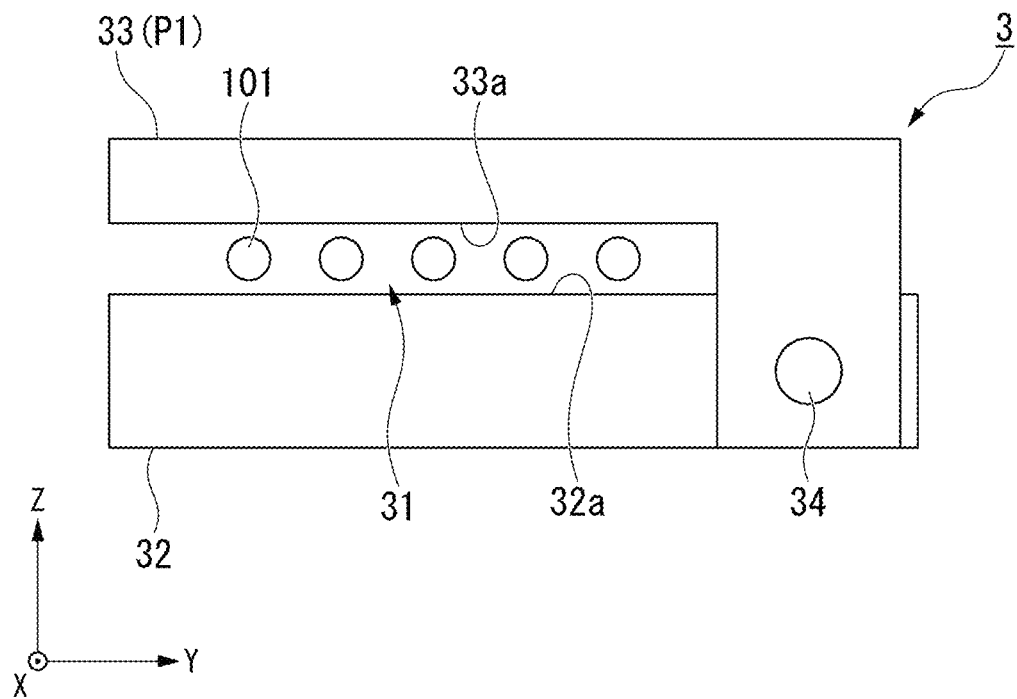
FIG. 12 is a side view showing a third modified example of the alignment member.

In the alignment member 3 of the optical fiber cutter according to one or more embodiments, for example, the recesses 321 and 331 (see FIG. 11 or the like) constituting the insertion hole 31 of the alignment member 3 may not be formed in the placement table 32 and the lid member 33 as shown in FIG. 12. That is, an inner surface of the insertion hole 31 of the alignment member 3 may be formed only by the flat placement surface 32a of the placement table 32 and the flat facing surface 33a of the lid member 33 facing each other at a distance in the second perpendicular direction (Z-axis direction) in a state in which the lid member 33 is disposed at the first position P1.

Figure 13:
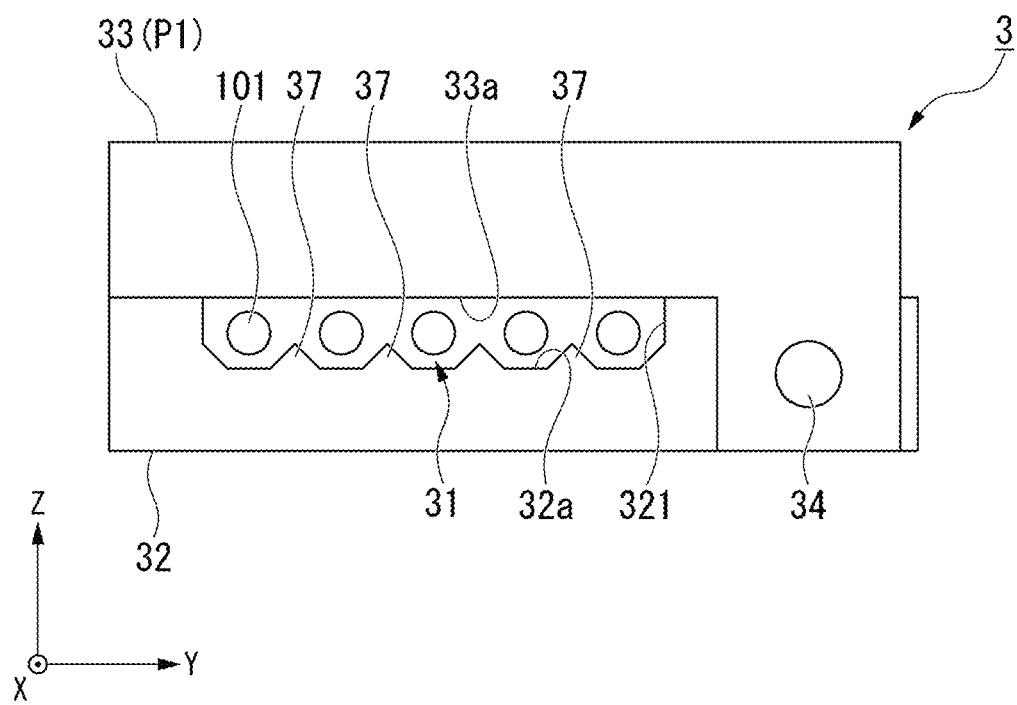
FIG. 13 is a side view showing a fourth modified example of the alignment member.
Figure 14:
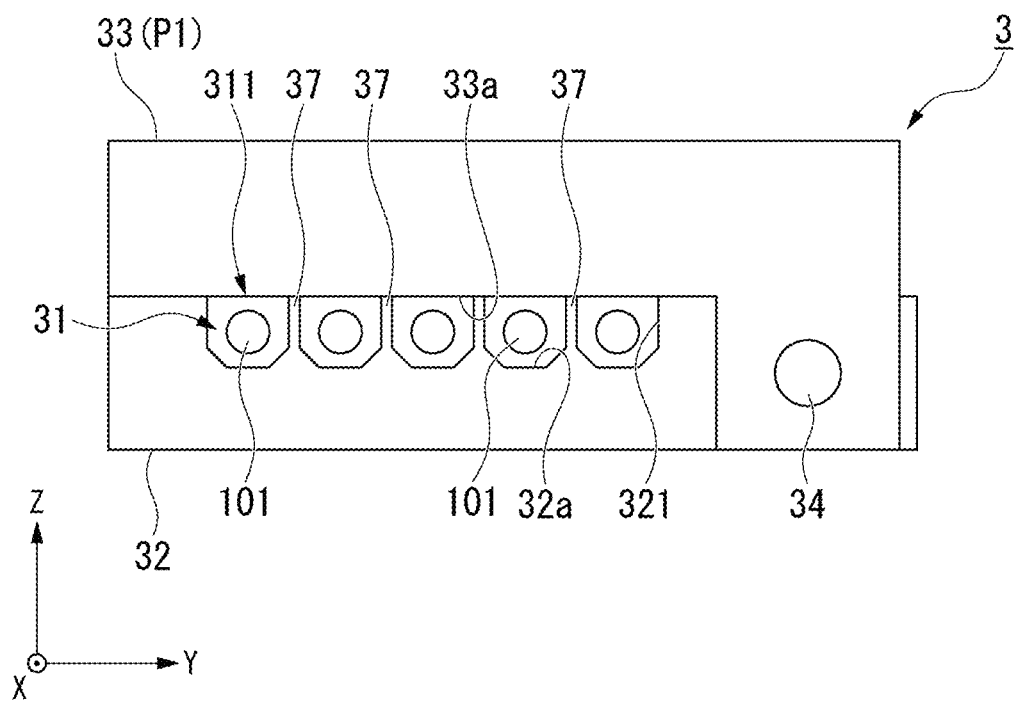
FIG. 14 is a side view showing a fifth modified example of the alignment member.

In the alignment member 3 of the optical fiber cutter according to one or more embodiments, for example, a plurality of guide protrusions 37 may be provided on the placement surface 32a of the placement table 32 as shown in FIGS. 13 and 14. The plurality of guide protrusions 37 are disposed at intervals in the first perpendicular direction (Y-axis direction). The plurality of guide protrusions 37 are aligned at regular intervals in the first perpendicular direction. Accordingly, in a state in which the plurality of glass portions 101 are inserted into the insertion hole 31 of the alignment member 3, the plurality of glass portions 101 can be aligned at regular intervals in the first perpendicular direction by interposing the guide protrusion 37 between two adjacent glass portions 101.

Also, an interval between adjacent guide protrusions 37 in the first perpendicular direction is larger than the diameter dimension D of the glass portions 101. Therefore, the glass portion 101 is sandwiched between two adjacent guide protrusions 37 in the first perpendicular direction, and therefore the occurrence of stress in the glass portion 101 can be minimized or prevented.

In the alignment member 3 shown in FIG. 13, a protrusion height of each guide protrusion 37 protruding in the second perpendicular direction (Z-axis direction) from the placement surface 32a of the placement table 32 is smaller than the height dimension H (see FIG. 3) of the insertion hole 31 in the second perpendicular direction. In this case, even when the plurality of guide protrusions 37 are formed on the inner surface of the insertion hole 31, the plurality of glass portions 101 can be easily inserted into the insertion hole 31.

On the other hand, in the alignment member 3 shown in FIG. 14, a protrusion height of each guide protrusion 37 protruding in the second perpendicular direction (Z-axis direction) from the placement surface 32a of the placement table 32 is equal to the height dimension H (see FIG. 3) of the insertion hole 31 in the second perpendicular direction.

Therefore, the insertion hole 31 is segmented into a plurality of segmented holes 311 aligned in the first perpendicular direction (Y-axis direction) by the plurality of guide protrusions 37. In this case, in a state in which the plurality of glass portions 101 are inserted into the insertion hole 31 of the alignment member 3, the plurality of glass portions 101 can be more reliably aligned at regular intervals in the first perpendicular direction.

Further, in the alignment member 3 of FIGS. 13 and 14, the guide protrusions 37 may be provided, for example, on the facing surface 33a of the lid member 33, or may be provided on both the placement surface 32a of the placement table 32 and the facing surface 33a of the lid member 33. Also, the guide protrusions 37 shown in FIGS. 13 and 14 are not limited to be applied to the alignment member 3 in which the recess 321 is formed only in the placement table 32, and may be applied to the alignment member 3 in which the recess 331 is formed only in the lid member 33 (see FIG. 10), the alignment member 3 in which the recesses 321 and 331 are formed in both the placement table 32 and the lid member 33 (see FIG. 11), and the alignment member 3 in which the recesses 321 and 331 are not formed in both the placement table 32 and the lid member 33 (see FIG. 12).

In the alignment member 3 of the optical fiber cutter according to one or more embodiments, the lid member 33 may be, for example, detachably provided with respect to the placement table 32. That is, the lid member 33 may be disposed at the first position P1 to form the insertion hole 31 together with the placement table 32 when the lid member 33 is attached to the placement table 32, and the lid member 33 may be disposed at the second position P2 to open the placement surface 32a of the placement table 32 when the lid member 33 is detached from the placement table 32.

Figure 15:
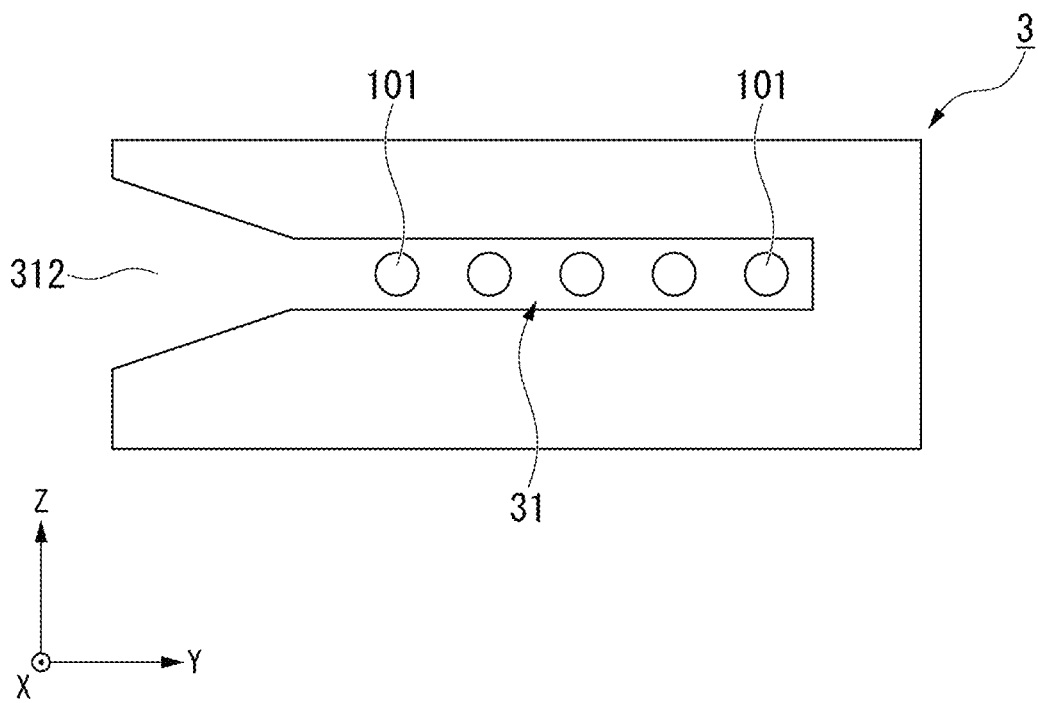
FIG. 15 is a side view showing a sixth modified example of the alignment member.

The alignment member 3 of the optical fiber cutter according to one or more embodiments is not limited to being configured by the two components of the placement table 32 and the lid member 33, and may be configured by, for example, a single component as shown in FIG. 15. In this case, the insertion hole 31 of the alignment member 3 may open toward one side of the alignment member 3 in the first perpendicular direction (Y-axis direction). Therefore, the plurality of glass portions 101 can be easily put into the insertion hole 31 from an opening 312 of the insertion hole 31 in the first perpendicular direction. Also, as shown in FIG. 15, a dimension of the opening 312 of the insertion hole 31 in the second perpendicular direction (Z-axis direction) may be formed to increase toward the outside of the alignment member 3 in the first perpendicular direction (Y-axis direction). Therefore, the plurality of glass portions 101 can be put into the insertion hole 31 more easily from the opening 312 of the insertion hole 31.

In an optical fiber cutter according to one or more embodiments, for example, the alignment member 3 may be undetachably attached to the base 4 to be movable between a placement position P3 placed on the second placement portion 42 and a separation position P4 separated from the second placement portion 42 as shown in FIGS. 16 to 21. In this case, the alignment member 3 can be prevented from being lost compared to a case in which the alignment member 3 is detachably attached to the base 4.

Figure 16:
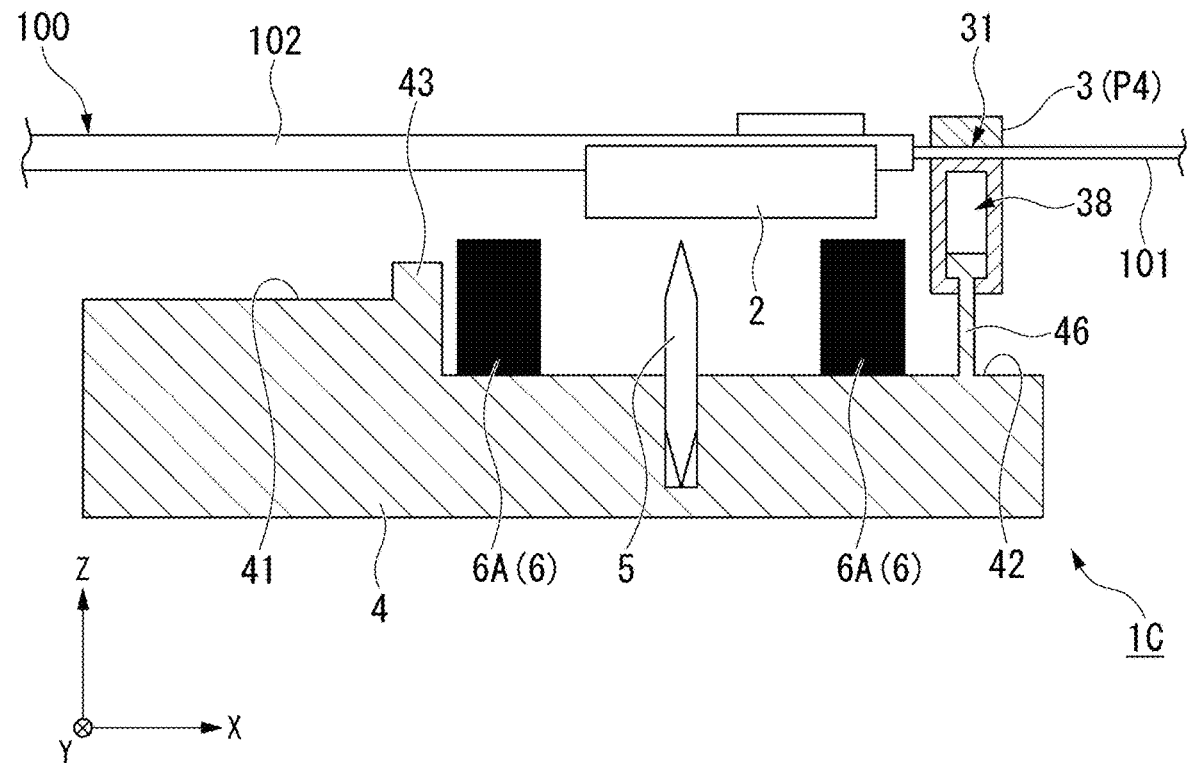
FIG. 16 is cross-sectional explanatory a view showing a method of cutting a plurality of optical fibers using an optical fiber cutter according to one or more embodiments.
Figure 17:
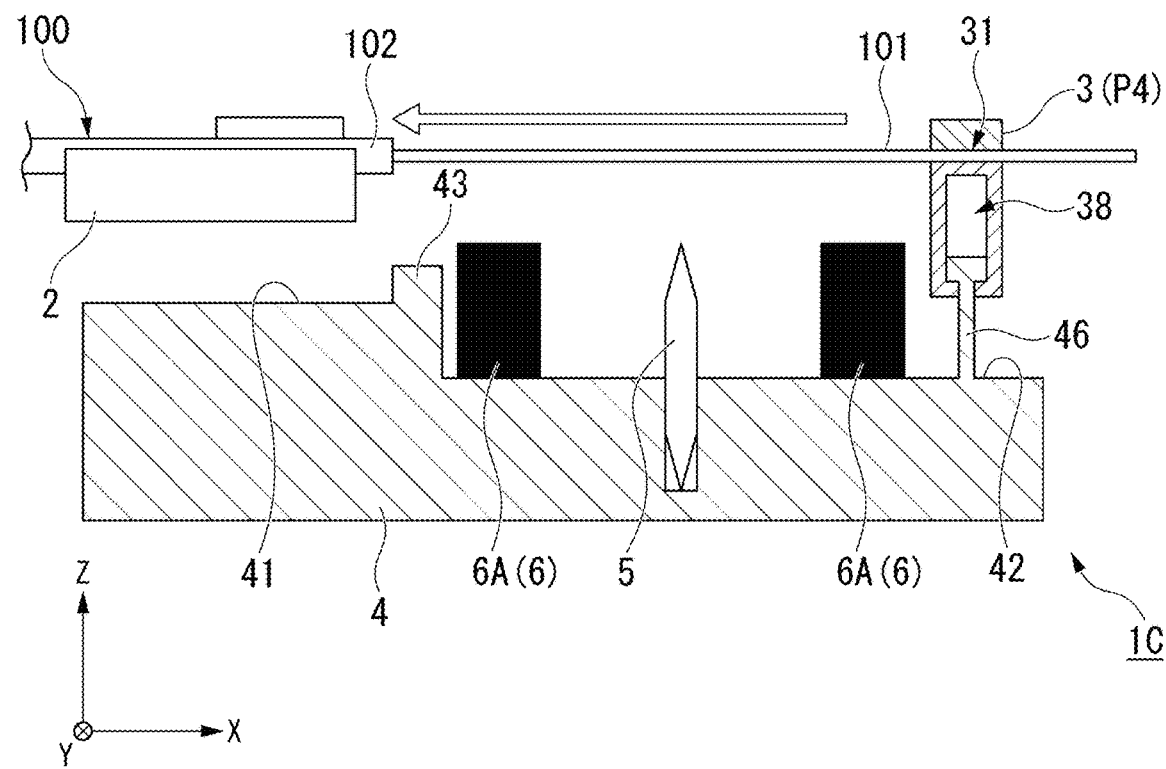
FIG. 17 is a cross-sectional explanatory view showing the method of cutting the plurality of optical fibers using the optical fiber cutter shown in FIG. 16.
Figure 18:
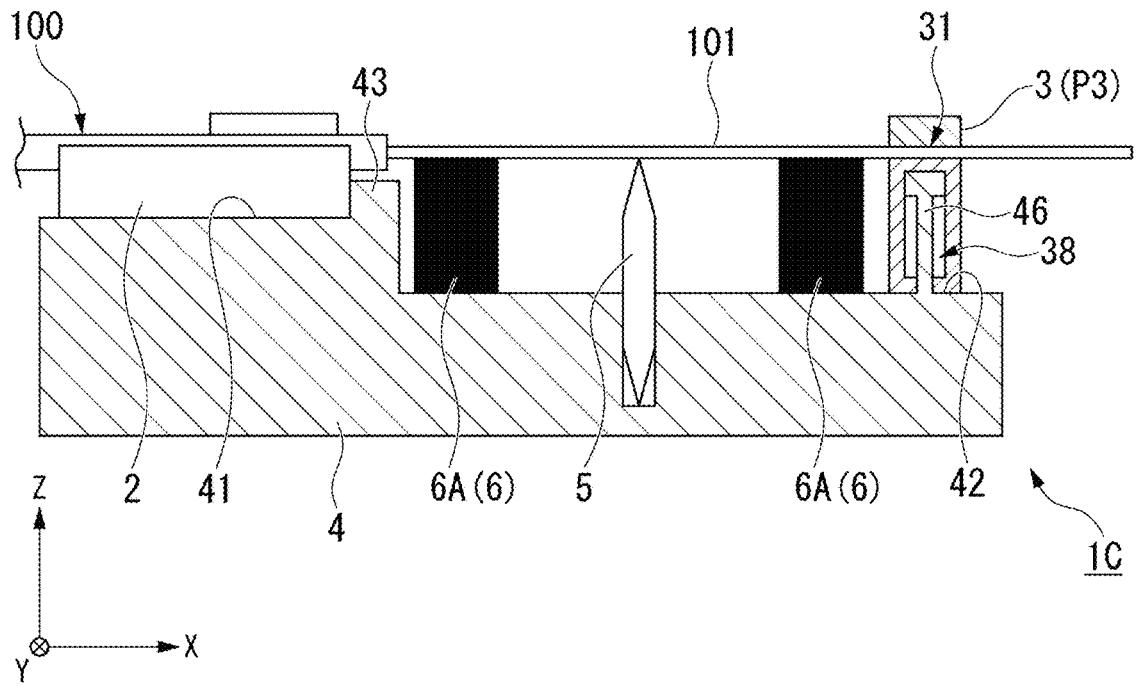
FIG. 18 is a cross-sectional explanatory view showing the method of cutting the plurality of optical fibers using the optical fiber cutter shown in FIG. 16.

In an optical fiber cutter 1C shown in FIGS. 16 to 18, the alignment member 3 is undetachably attached to the base 4. On the other hand, the alignment member 3 is attached to the base 4 so as to move (to be movable) in the second perpendicular direction (Z-axis direction). The second perpendicular direction is the direction perpendicular to the longitudinal direction (X-axis direction) and the first perpendicular direction (Y-axis direction). In the shown example, the second placement portion 42 is provided with a rod 46 extending upward (Z-axis positive direction) in the second perpendicular direction. A distal end portion of the rod 46 is formed to be larger than the other portion of the rod 46 and is inserted into a cavity 38 formed in the alignment member 3. The cavity 38 is formed so that the distal end portion of the rod 46 does not come out of the cavity 38, and the alignment member 3 is movable by a predetermined distance in the longitudinal direction (second perpendicular direction) of the rod 46. Therefore, the alignment member 3 is movable in the second perpendicular direction between the placement position P3 placed on the second placement portion 42 (see FIG. 18) and the separation position P4 separated from the second placement portion 42 (see FIGS. 16 and 17). The separation position P4 of the alignment member 3 is preferably a position where the plurality of optical fibers 100 or the fiber holder 2 holding the plurality of optical fibers 100 does not interfere with each portion (the base 4, the blade member 5, the pair of clamps 6, or the like) of the optical fiber cutter 1C in a state in which the plurality of glass portions 101 are inserted into the insertion hole 31.

A penetration direction of the insertion hole 31 of the alignment member 3 attached to the base 4 coincides with a direction in which the first placement portion 41 and the second placement portion 42 are aligned (X-axis direction) regardless of a position of the alignment member 3 (the placement position P3 or the separation position P4).

When the plurality of glass portions 101 are cut in the optical fiber cutter 1C shown in FIGS. 16 to 18, first, similarly to the above-described embodiments, the plurality of optical fibers 100 are held by the fiber holder 2 (see FIG. 4), and the coated portions 102 are removed from parts of the plurality of optical fibers 100 extending from the fiber holder 2 to expose the plurality of glass portions 101 (see FIG. 5). Next, as shown in FIG. 16, in a state in which the alignment member 3 is disposed at the separation position P4, parts of the plurality of glass portions 101 positioned near the fiber holder 2 are inserted into the insertion hole 31 of the alignment member 3.

Thereafter, as shown in FIG. 17, the fiber holder 2 is moved in a direction away from the alignment member 3 (in a leftward direction in FIG. 17). Here, the penetration direction of the insertion hole 31 of the alignment member 3 attached to the base 4 coincides with the direction in which the first placement portion 41 and the second placement portion 42 are aligned. Therefore, when the fiber holder 2 is separated from the alignment member 3, the fiber holder 2 moves in the direction in which the first placement portion 41 and the second placement portion 42 are aligned.

In FIG. 17, in a state in which the plurality of the glass portions 101 are inserted into the insertion hole 31 of the alignment member 3 and the alignment member 3 is fixed, the fiber holder 2 moves so as to be separated from the alignment member 3. As described with reference to FIGS. 6B to 6D, an overlap state of the plurality of the glass portions 101 is gradually released in accordance with relative movement between the fiber holder 2 and the alignment member 3, that is, in accordance with movement of the fiber holder 2 shown in FIG. 17. After pass of the fiber holder 2, the plurality of the glass portions 101 do not overlap from each other between the alignment member 3 and the fiber holder 2 (that is, the right side of the fiber holder 2), and a state in which the overlap of the plurality of the glass portions 101 is released, that is, a state in which the plurality of the glass portions 101 are aligned is obtained.

Thereafter, as shown in FIG. 18, the fiber holder 2 is placed on the first placement portion 41, and the alignment member 3 is moved from the separation position P4 to the placement position P3 to be placed on the second placement portion 42. Thereafter, as in the above-described embodiments, the plurality of glass portions 101 positioned between the alignment member 3 and the fiber holder 2 can be cut by holding them with the pair of clamps 6, scratching them with the blade member 5, and press-bending them with the pressing member 7.

In the optical fiber cutter 1C shown in FIGS. 16 to 18, the alignment member 3 is attached to the base 4 to be movable in the second perpendicular direction. Therefore, the fiber holder 2 can be moved relative to the alignment member 3 in the direction in which the first placement portion 41 and the second placement portion 42 are aligned in a state in which the alignment member 3 is disposed at the separation position P4. Accordingly, the fiber holder 2 can be easily aligned with the first placement portion 41 while the fiber holder 2 is moved relative to the alignment member 3.

Figure 19:
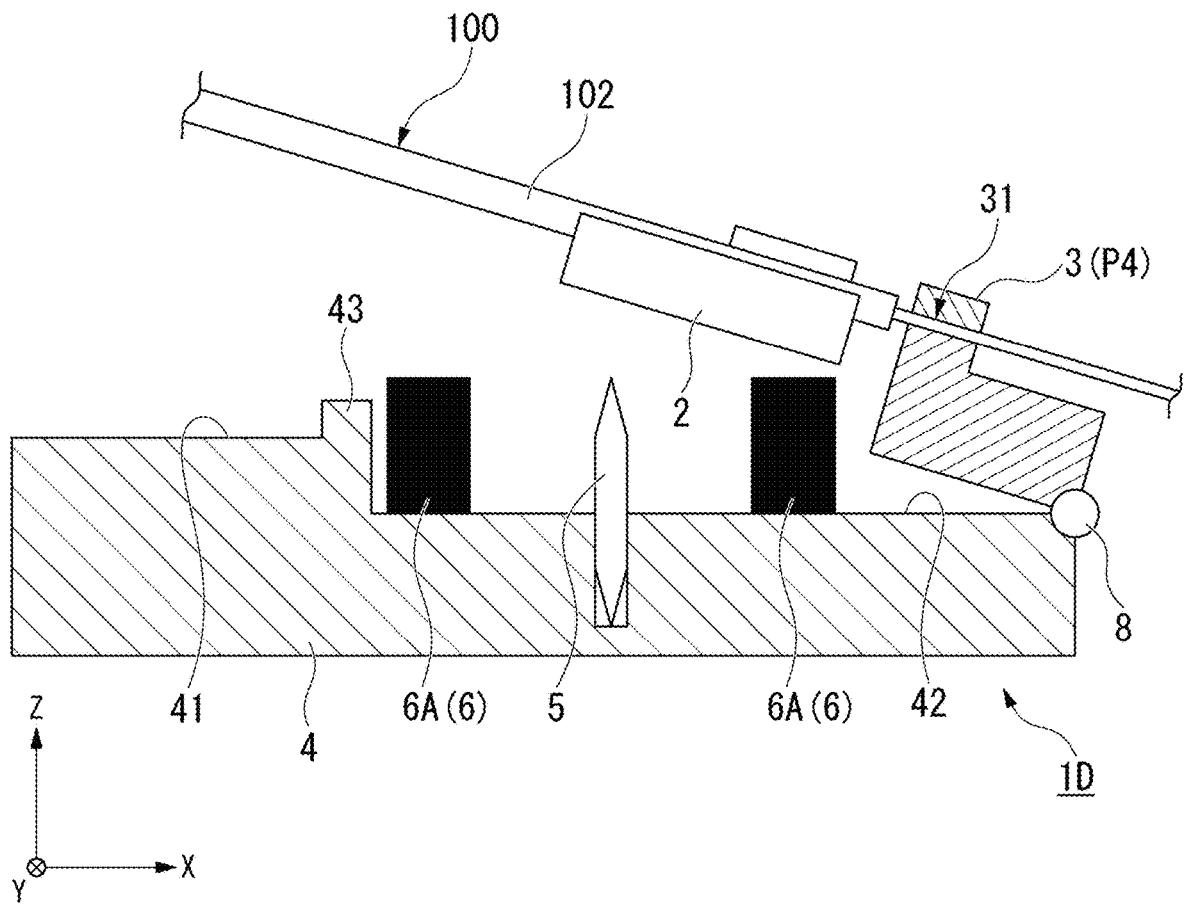
FIG. 19 is a cross-sectional explanatory view showing a method of cutting a plurality of optical fibers using an optical fiber cutter according to one or more embodiments.
Figure 20:
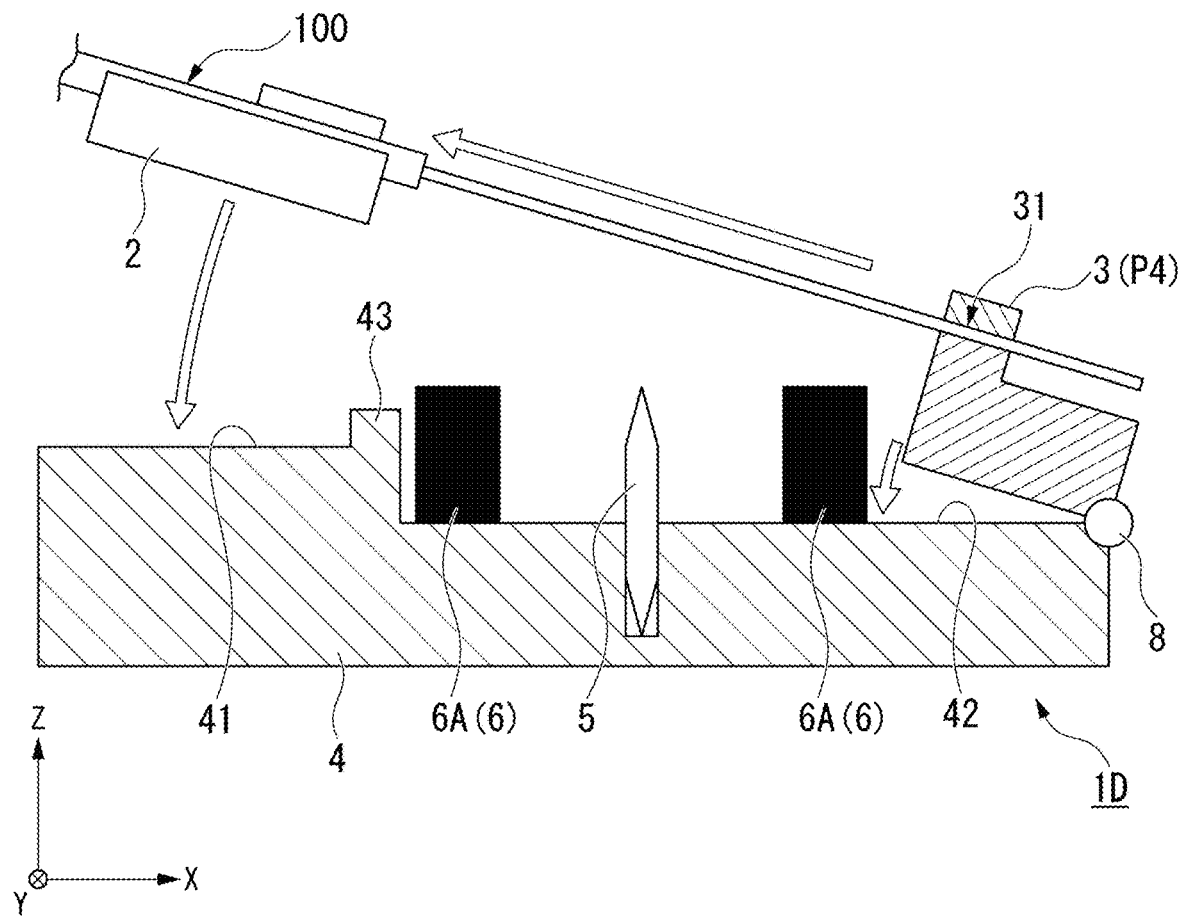
FIG. 20 is a cross-sectional explanatory view showing the method of cutting the plurality of optical fibers using the optical fiber cutter shown in FIG. 19.
Figure 21:
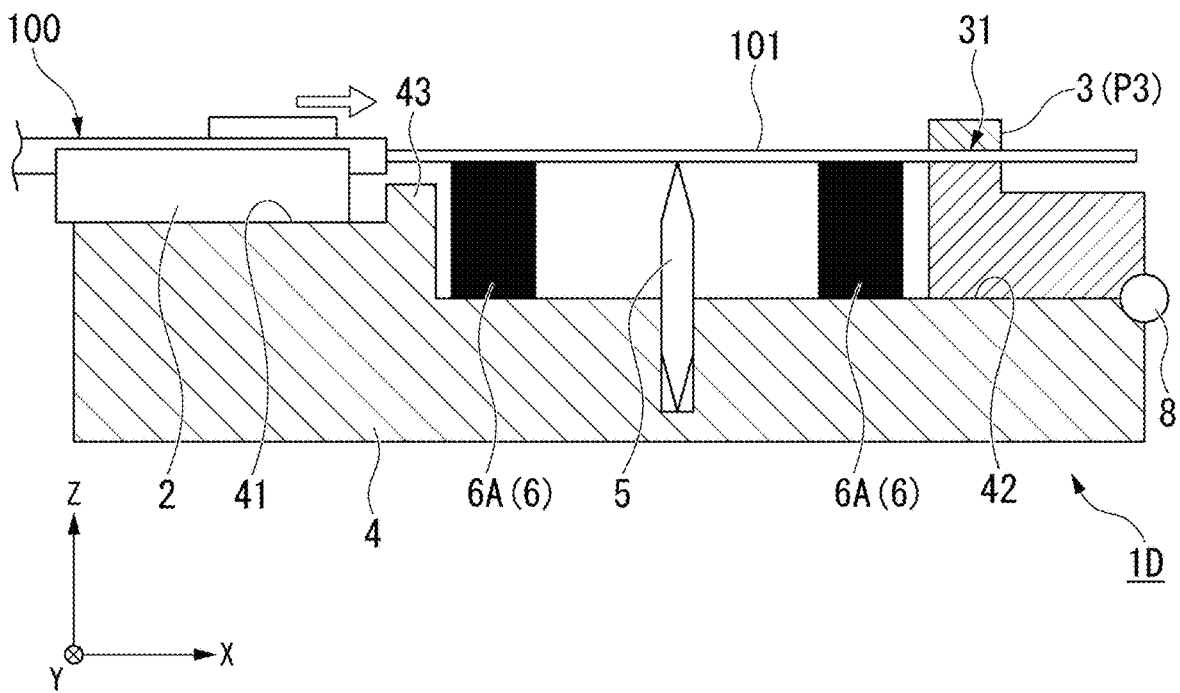
FIG. 21 is a cross-sectional explanatory view showing the method of cutting the plurality of optical fibers using the optical fiber cutter shown in FIG. 19.

In an optical fiber cutter 1D shown in FIGS. 19 to 21, the alignment member 3 is undetachably attached to the base 4. On the other hand, the alignment member 3 is attached to the base 4 so as to be rotatable with a fulcrum shaft 8 parallel to the first perpendicular direction (Y-axis direction) as a center. In a state in which the alignment member 3 is disposed at the placement position P3 (the first placement portion 41) as shown in FIG. 21, the fulcrum shaft 8 is positioned farther from the first placement portion 41 than the insertion hole 31 of the alignment member 3 in a direction in which the first placement portion 41 and the second placement portion 42 are aligned (X-axis direction). Also, in a state in which the alignment member 3 is disposed at the placement position P3, a penetration direction of the insertion hole 31 of the alignment member 3 coincides with the direction in which the first placement portion 41 and the second placement portion 42 are aligned. Therefore, as shown in FIGS. 19 and 20, when the alignment member 3 is rotationally moved from the placement position P3 to the separation position P4, an insertion direction of the insertion hole 31 is inclined upward (Z-axis positive direction) from the first placement portion 41 toward the second placement portion 42 side in the direction in which the first placement portion 41 and the second placement portion 42 are aligned. Therefore, in a state in which the alignment member 3 is disposed at the separation position P4, the plurality of optical fibers 100 and the fiber holder 2 holding the optical fibers 100 do not interfere with each portion of the optical fiber cutter 1D (the base 4, the blade member 5, the pair of clamps 6, or the like) in a state in which the plurality of glass portions 101 are inserted into the insertion hole 31.

When the plurality of glass portions 101 are cut in the optical fiber cutter 1D shown in FIGS. 19 to 21, first, similarly to the above-described embodiments, the plurality of optical fibers 100 are held by the fiber holder 2 (see FIG. 4), and the coated portions 102 are removed from the parts of the plurality of optical fibers 100 extending from the fiber holder 2 to expose the plurality of glass portions 101 (see FIG. 5). Next, as shown in FIG. 19, in a state in which the alignment member 3 is aligned at the separation position P4, parts of the plurality of glass portions 101 positioned near the fiber holder 2 are inserted into the insertion hole 31 of the alignment member 3.

Thereafter, as shown in FIG. 20, the fiber holder 2 is moved in a direction away from the alignment member 3 (in an upper left direction in FIG. 20). Particularly, in a state in which the plurality of the glass portions 101 are inserted into the insertion hole 31 of the alignment member 3 and the alignment member 3 is fixed, the fiber holder 2 moves in the upper left direction so as to be separated from the alignment member 3. As described with reference to FIGS. 6B to 6D, an overlap state of the plurality of the glass portions 101 is gradually released in accordance with relative movement between the fiber holder 2 and the alignment member 3, that is, in accordance with movement of the fiber holder 2 shown in FIG. 20. After pass of the fiber holder 2, the plurality of the glass portions 101 do not overlap from each other between the alignment member 3 and the fiber holder 2 (that is, the lower right side of the fiber holder 2), and a state in which the overlap of the plurality of the glass portions 101 is released, that is, a state in which the plurality of the glass portions 101 are aligned is obtained.

Then, as shown in FIG. 21, the alignment member 3 is rotationally moved from the separation position P4 to the placement position P3 to place the fiber holder 2 on the first placement portion 41 and place the alignment member 3 on the second placement portion 42. As shown in FIG. 21, when the fiber holder 2 placed on the first placement portion 41 is positionally deviated in a disposition direction of the first placement portion 41 and the second placement portion 42 (X-axis direction), the fiber holder 2 may be moved in the disposition direction on the first placement portion 41. Thereafter, as in the above-described embodiments, the plurality of glass portions 101 positioned between the alignment member 3 and the fiber holder 2 can be cut by holding them with the pair of clamps 6, scratching them with the blade member 5, and press-bending them with the pressing member 7.

REFERENCE SIGNS LIST 1, 1C, 1D Optical fiber cutter
2 Fiber holder
3 Alignment member
4 Base
5 Blade member
8 Fulcrum shaft
31 Insertion hole
32 Placement table
32a Placement surface
33 Lid member
41 First placement portion
42 Second placement portion
100 Optical fiber
101 Glass portion
102 Coated portion
P1 First position
P2 Second position

The invention claimed is:

1. An optical fiber cutter comprising:
a fiber holder that holds optical fibers disposed in a row in a first perpendicular direction perpendicular to a longitudinal direction of the optical fibers, wherein each of the optical fibers comprises a glass portion and a coated portion that covers the glass portion;
an alignment member having an insertion hole through which the glass portions extending from the fiber holder are inserted;
a base comprising;
a first placement portion on which the fiber holder is disposed; and
a second placement portion positioned at a distance from the first placement portion, and on which the alignment member is disposed; and
a blade member that scratches surfaces of the glass portions by moving in the first perpendicular direction between the first placement portion and the second placement portion with respect to the base, wherein
an inner surface of the insertion hole does not press the glass portions in the insertion hole, and
the alignment member is undetachably attached to the base and moves in a second perpendicular direction perpendicular to the longitudinal direction and the first perpendicular direction.

2. An optical fiber cutter comprising:
a fiber holder that holds optical fibers disposed in a row in a first perpendicular direction perpendicular to a longitudinal direction of the optical fibers, wherein each of the optical fibers comprises a glass portion and a coated portion that covers the glass portion;
an alignment member having an insertion hole through which the glass portions extending from the fiber holder are inserted;
a base comprising;
a first placement portion on which the fiber holder is disposed; and
a second placement portion positioned at a distance from the first placement portion, and on which the alignment member is disposed; and
a blade member that scratches surfaces of the glass portions by moving in the first perpendicular direction between the first placement portion and the second placement portion with respect to the base, wherein
an inner surface of the insertion hole does not press the glass portions in the insertion hole,
the alignment member comprises a locking recess and is detachably attached to the base, and
the second placement portion has a locking protrusion to be inserted into the locking recess.

3. An optical fiber cutter comprising:
a fiber holder that holds optical fibers disposed in a row in a first perpendicular direction perpendicular to a longitudinal direction of optical fibers, wherein each of optical fibers comprises a glass portion and a coated portion that covers the glass portion;
an alignment member having an insertion hole through which the glass portions extending from the fiber holder are inserted;
a base comprising;
a first placement portion on which the fiber holder is disposed; and
a second placement portion positioned at a distance from the first placement portion, and on which the alignment member is disposed; and
a blade member that scratches surfaces of the glass portions by moving in the first perpendicular direction between the first placement portion and the second placement portion with respect to the base, wherein
an inner surface of the insertion hole does not press the glass portions in the insertion hole,
the alignment member is undetachably attached to the base and rotates with a fulcrum shaft parallel to the first perpendicular direction as a center.

4. The optical fiber cutter according to claim 1, wherein the alignment member comprises:
a placement table having a placement surface on which the glass portions are disposed; and
a lid member that moves between a first position and a second position at which the placement surface is open, wherein the lid member at the first position is apart from the placement surface in the second perpendicular direction such that the insertion hole is between the lid member and the placement surface.

5. The optical fiber cutter according to claim 4, wherein the lid member is connected to the placement table and rotationally moves between the first position and the second position.

6. The optical fiber cutter according to claim 1, wherein a height dimension of the insertion hole in the second perpendicular direction is larger than a diameter dimension of each of the glass portions and smaller than twice the diameter dimension.

7. A method of cutting an optical fiber, comprising:

preparing an optical fiber cutter including a fiber holder, an alignment member having an insertion hole, and a blade member;

with the fiber holder, holding optical fibers disposed in a row in a first perpendicular direction perpendicular to a longitudinal direction of the optical fiber, wherein each of optical fibers comprises a glass portion and a coated portion that covers the glass portion;

inserting the glass portions extending from the fiber holder through the insertion hole;

moving the alignment member to be separated from the fiber holder in a state in which the fiber holder is fixed, or moving both the fiber holder and the alignment member such that the fiber holder is separated from the alignment member;

aligning the glass portions such that parts of the glass portions positioned between the fiber holder and the alignment member are aligned in a row in the first perpendicular direction; and scratching surfaces of the glass portions with the blade member.

8. The optical fiber cutter according to claim 2, wherein the alignment member comprises:

a placement table having a placement surface on which the glass portions are disposed; and a lid member that moves between a first position and a second position at which the placement surface is open, wherein the lid member at the first position is apart from the placement surface in a second perpendicular direction perpendicular to the longitudinal direction and the first perpendicular direction such that the insertion hole is between the lid member and the placement surface.

9. The optical fiber cutter according to claim 8, wherein the lid member is connected to the placement table and rotationally moves between the first position and the second position.

10. The optical fiber cutter according to claim 2, wherein a height dimension of the insertion hole in a second perpendicular direction perpendicular to the longitudinal direction and the first perpendicular direction is larger than a diameter dimension of each of the glass portions and smaller than twice the diameter dimension.

11. The optical fiber cutter according to claim 3, wherein the alignment member comprises:

a placement table having a placement surface on which the glass portions are disposed; and a lid member that moves between a first position and a second position at which the placement surface is open, wherein the lid member at the first position is apart from the placement surface in a second perpendicular direction perpendicular to the longitudinal direction and the first perpendicular direction such that the insertion hole is between the lid member and the placement surface.

12. The optical fiber cutter according to claim 11, wherein the lid member is connected to the placement table and rotationally moves between the first position and the second position.

13. The optical fiber cutter according to claim 3, wherein a height dimension of the insertion hole in a second perpendicular direction perpendicular to the longitudinal direction and the first perpendicular direction is larger than a diameter dimension of each of the glass portions and smaller than twice the diameter dimension.

* * * * *